Nov. 30, 1954  R. C. GOERTZ ET AL  2,695,715
REMOTE-CONTROL MANIPULATOR
Filed Feb. 6, 1953
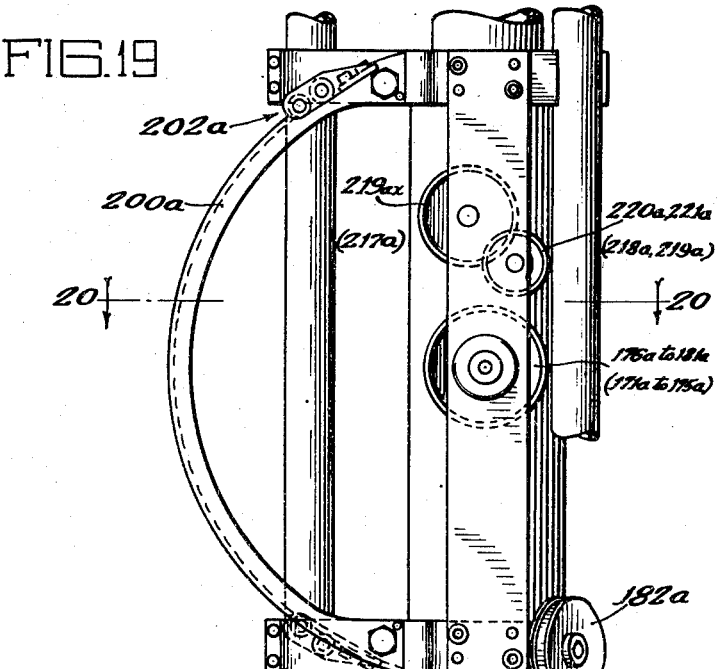
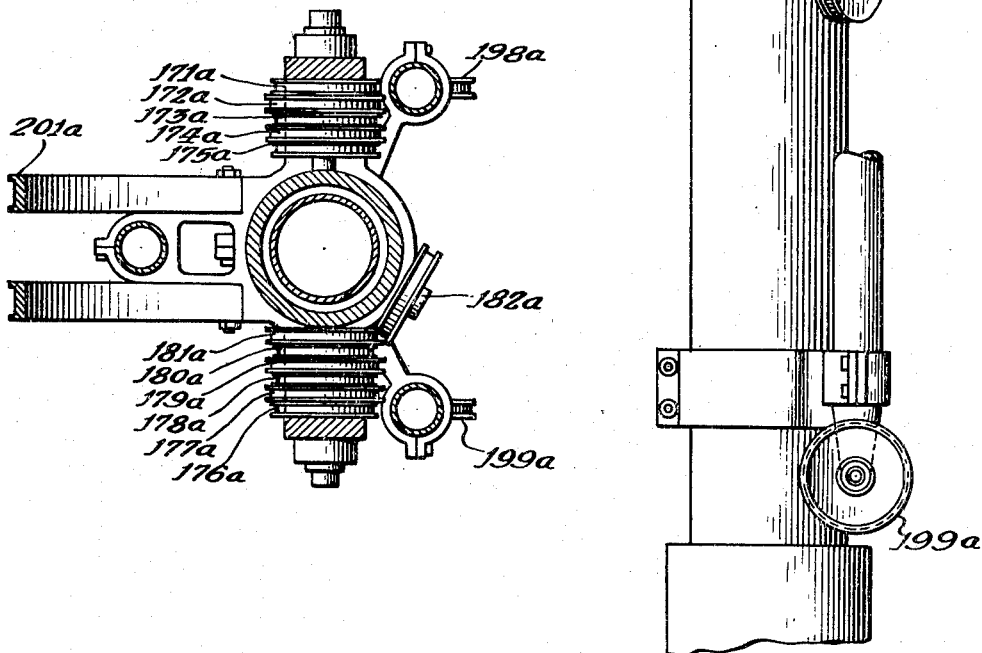
INVENTORS
Raymond C. Goertz
Roland G. Schmitt, Jr.
BY
Roland A. Anderson
Attorney Nov. 30, 1954   R. C. GOERTZ ET AL   2,695,715
REMOTE-CONTROL MANIPULATOR
Filed Feb. 6, 1953   22 Sheets-Sheet 10

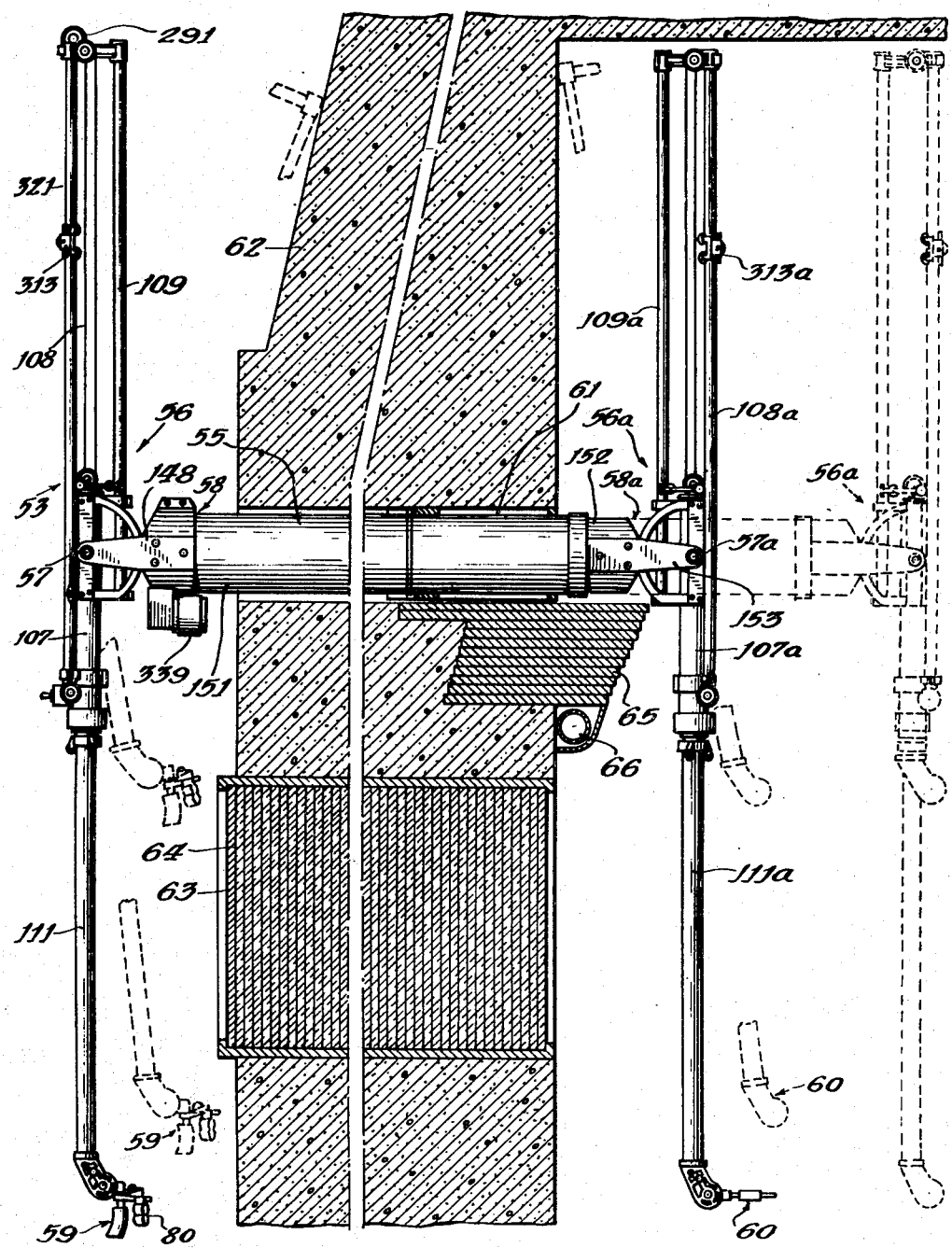

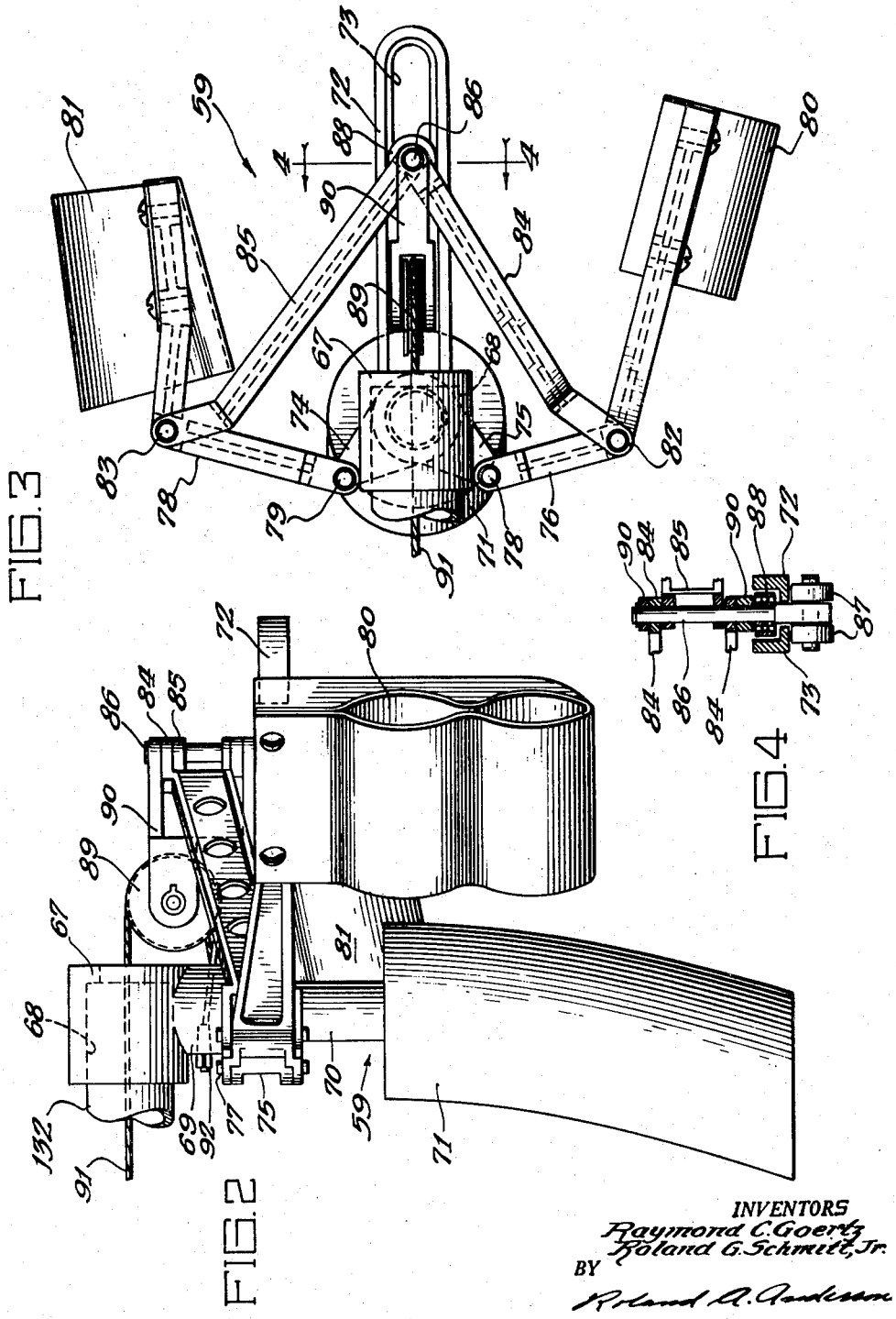

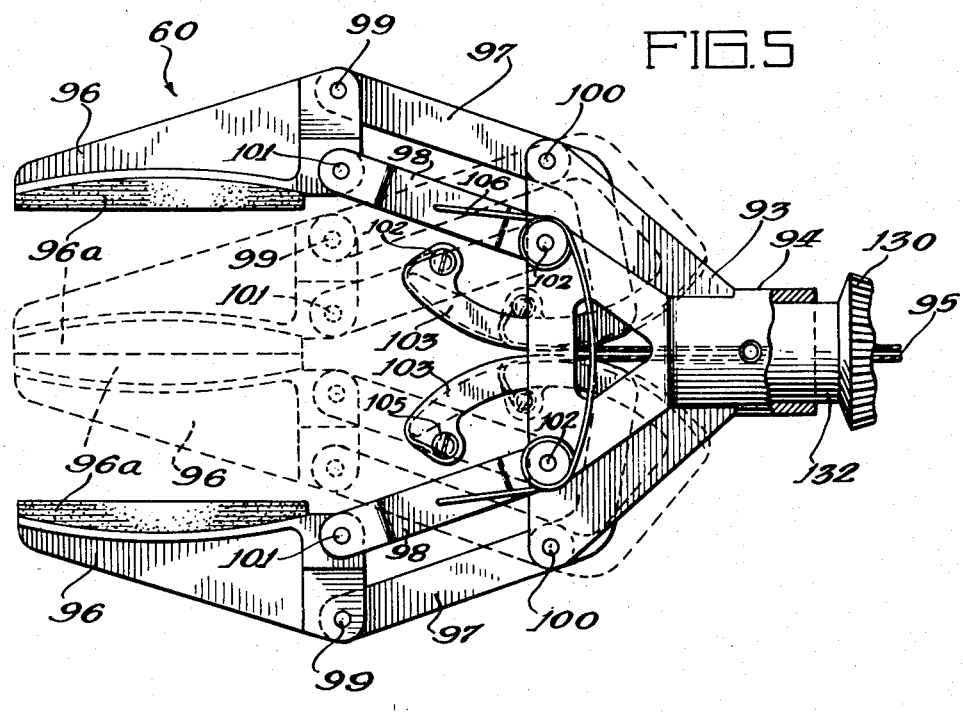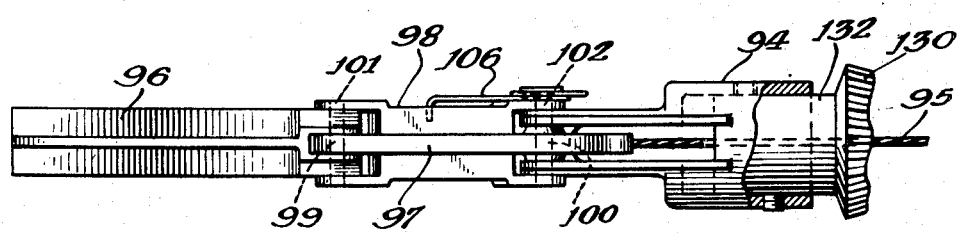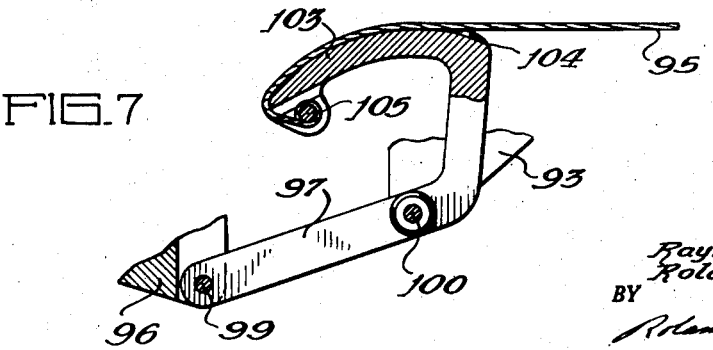

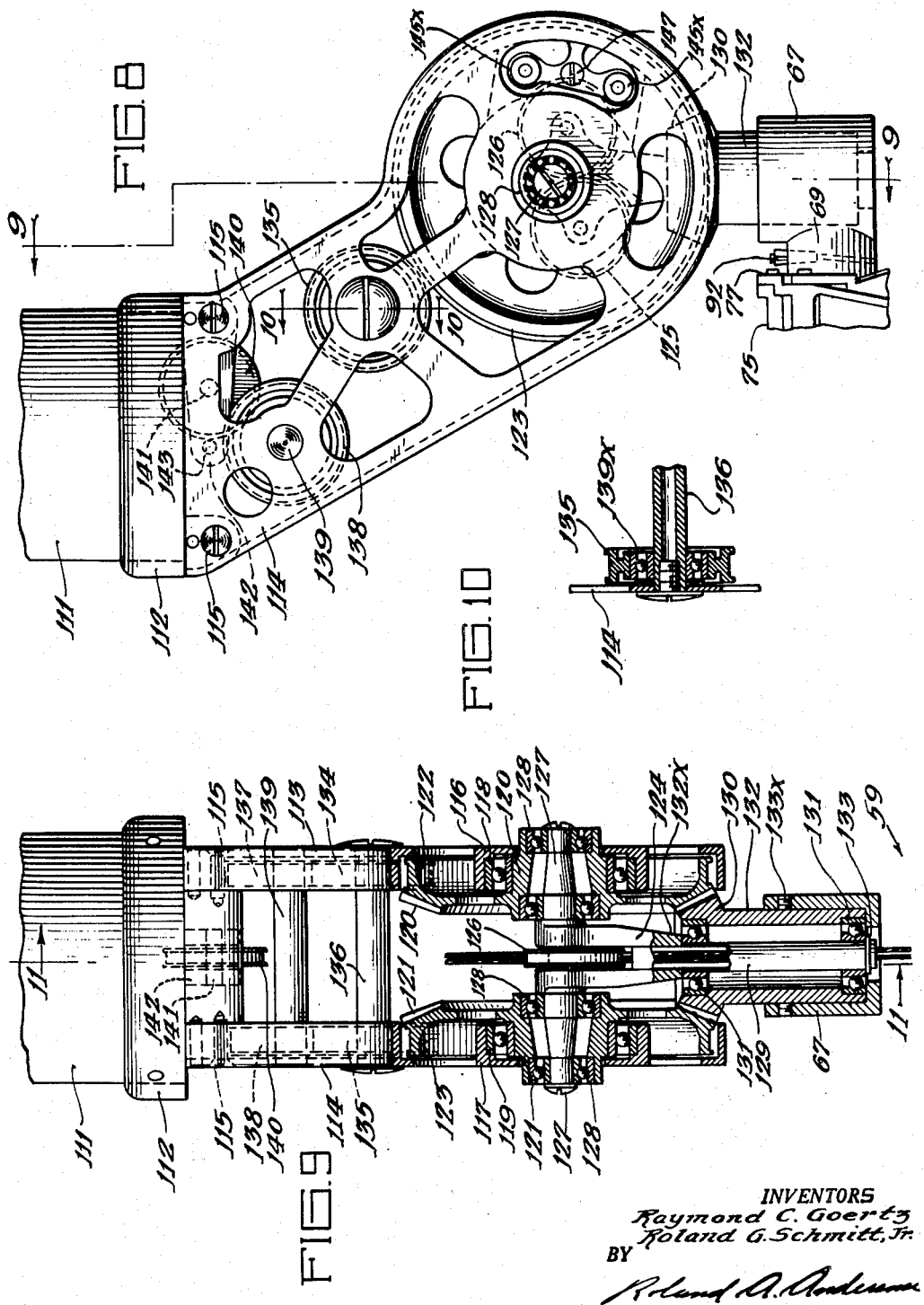

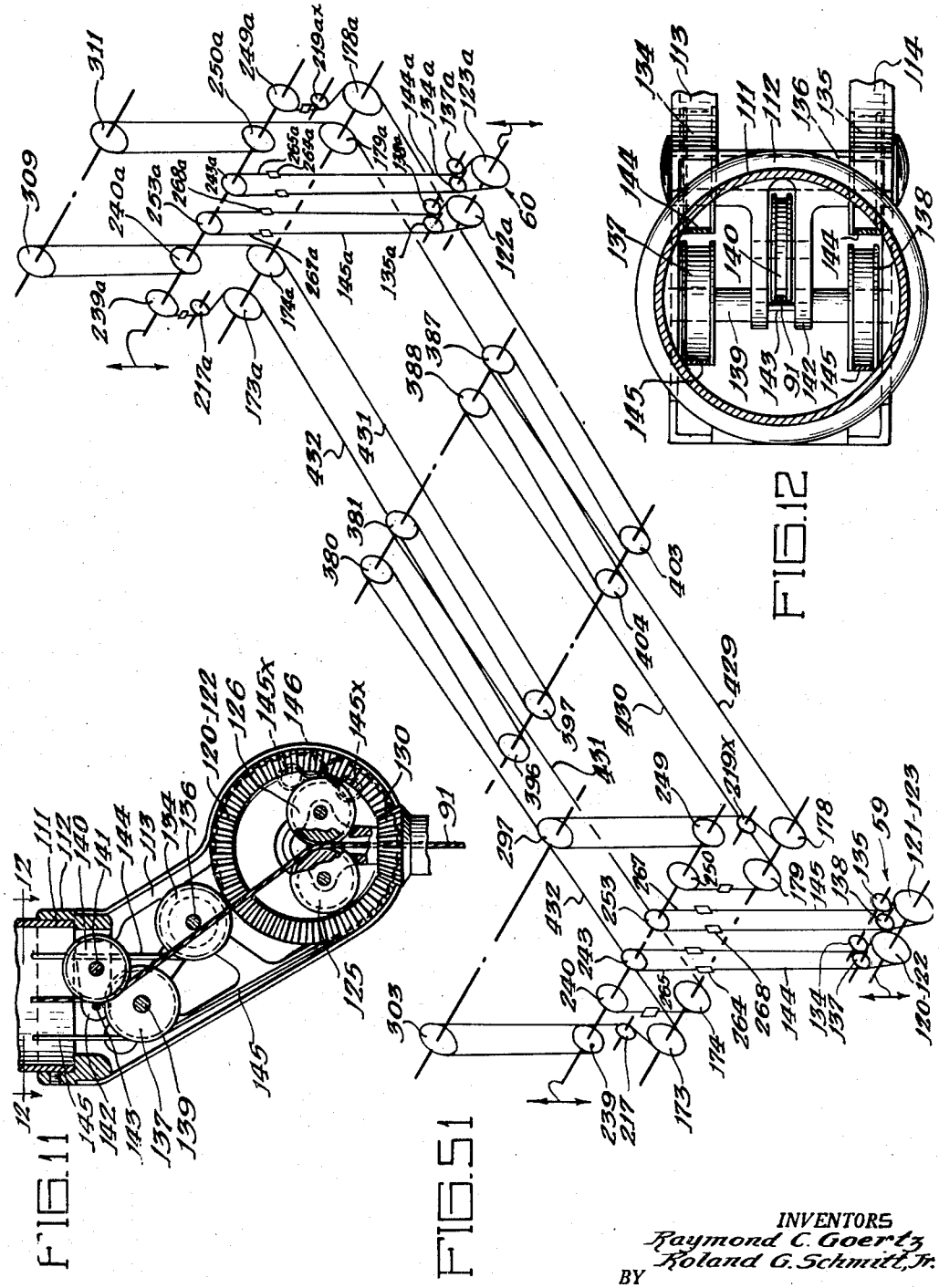

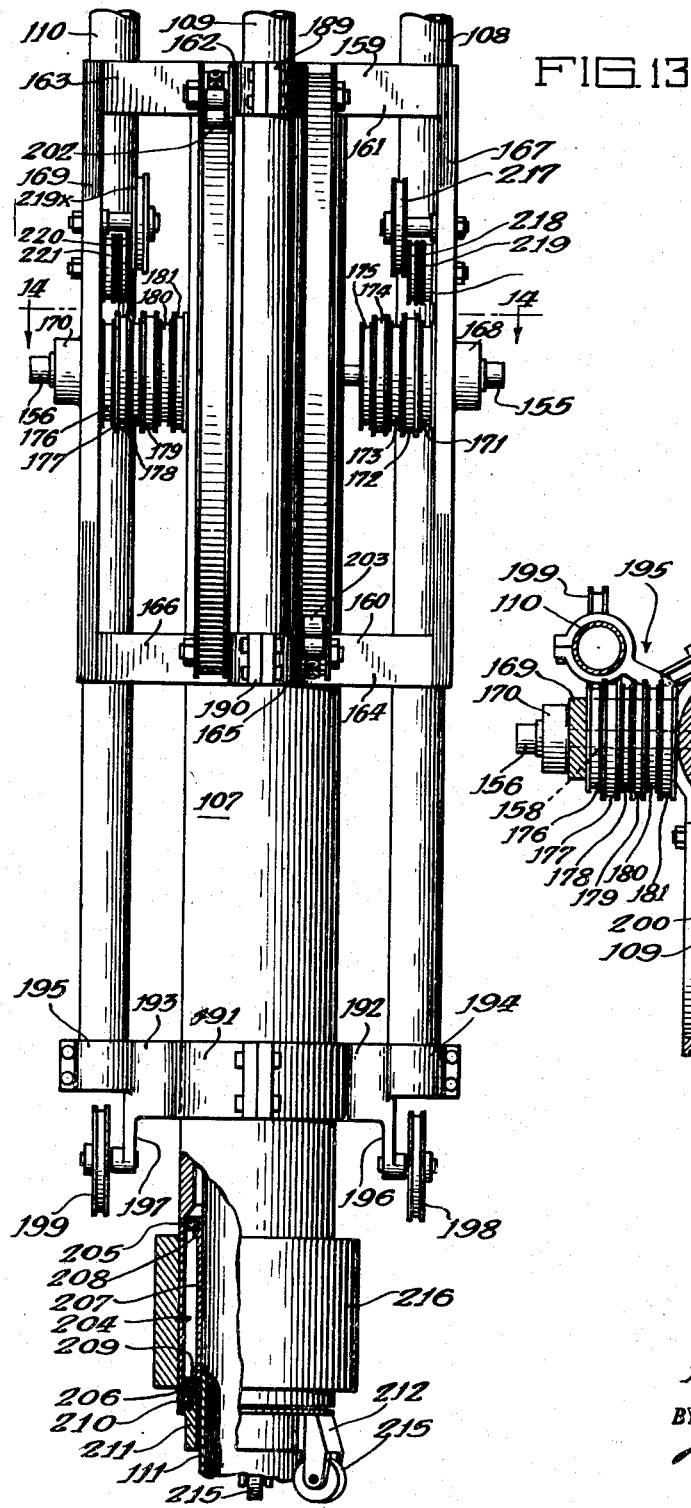
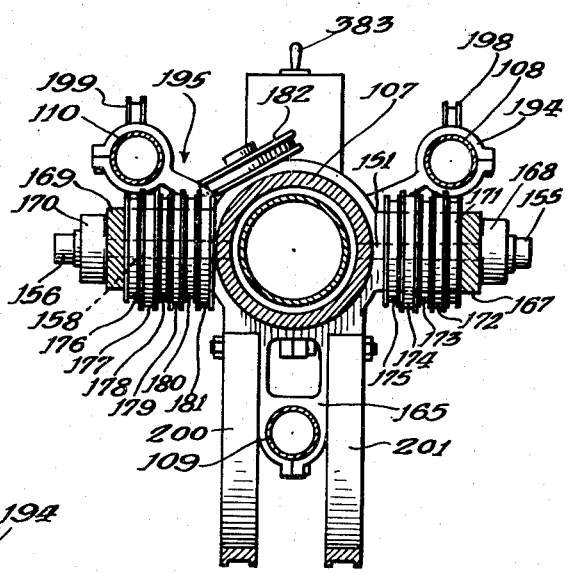
FIG.13
FIG.14
INVENTORS
Raymond C. Goertz,
Roland G. Schmitt, Jr.
BY
Roland G. Anderson
Attorney

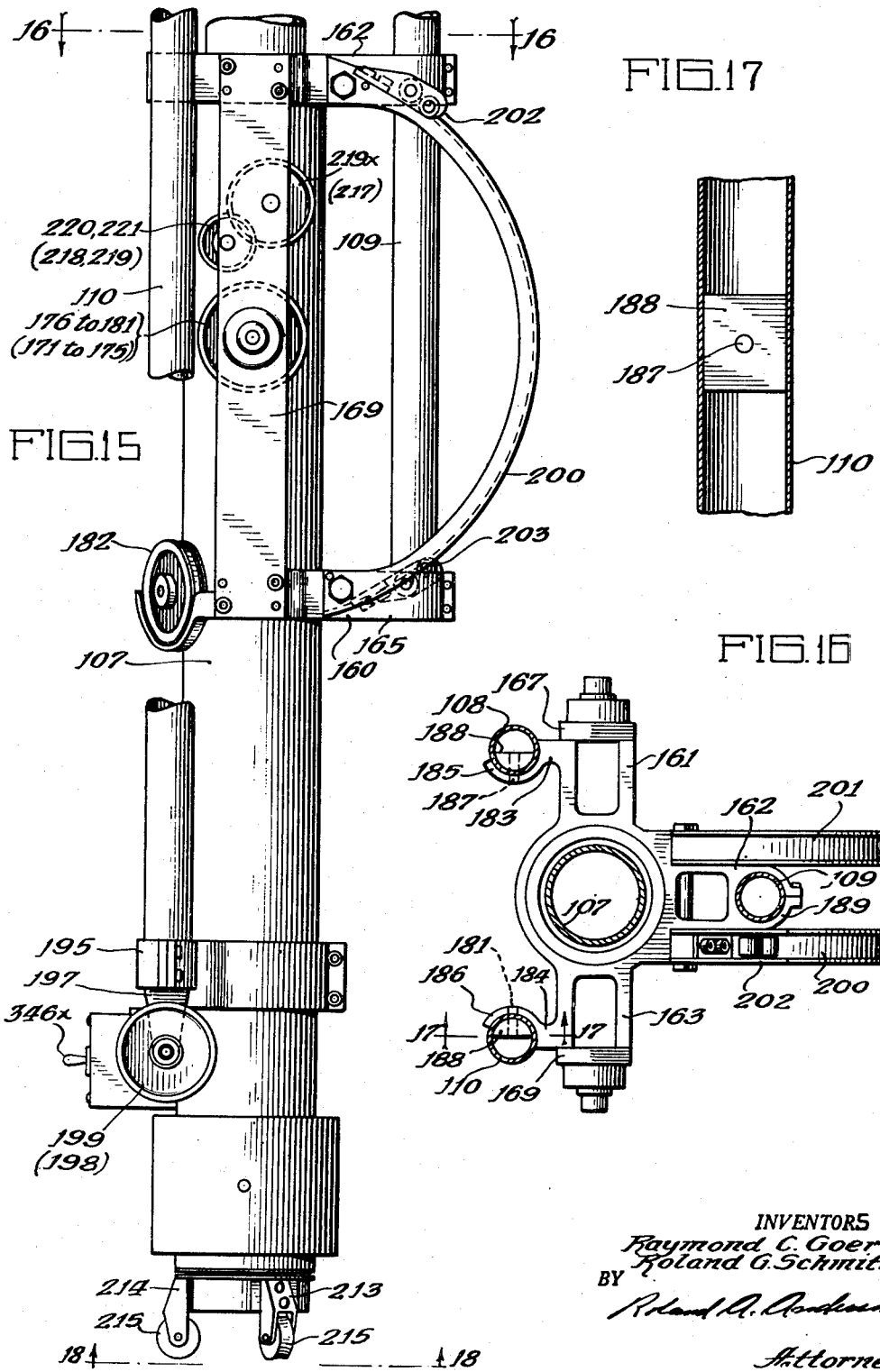

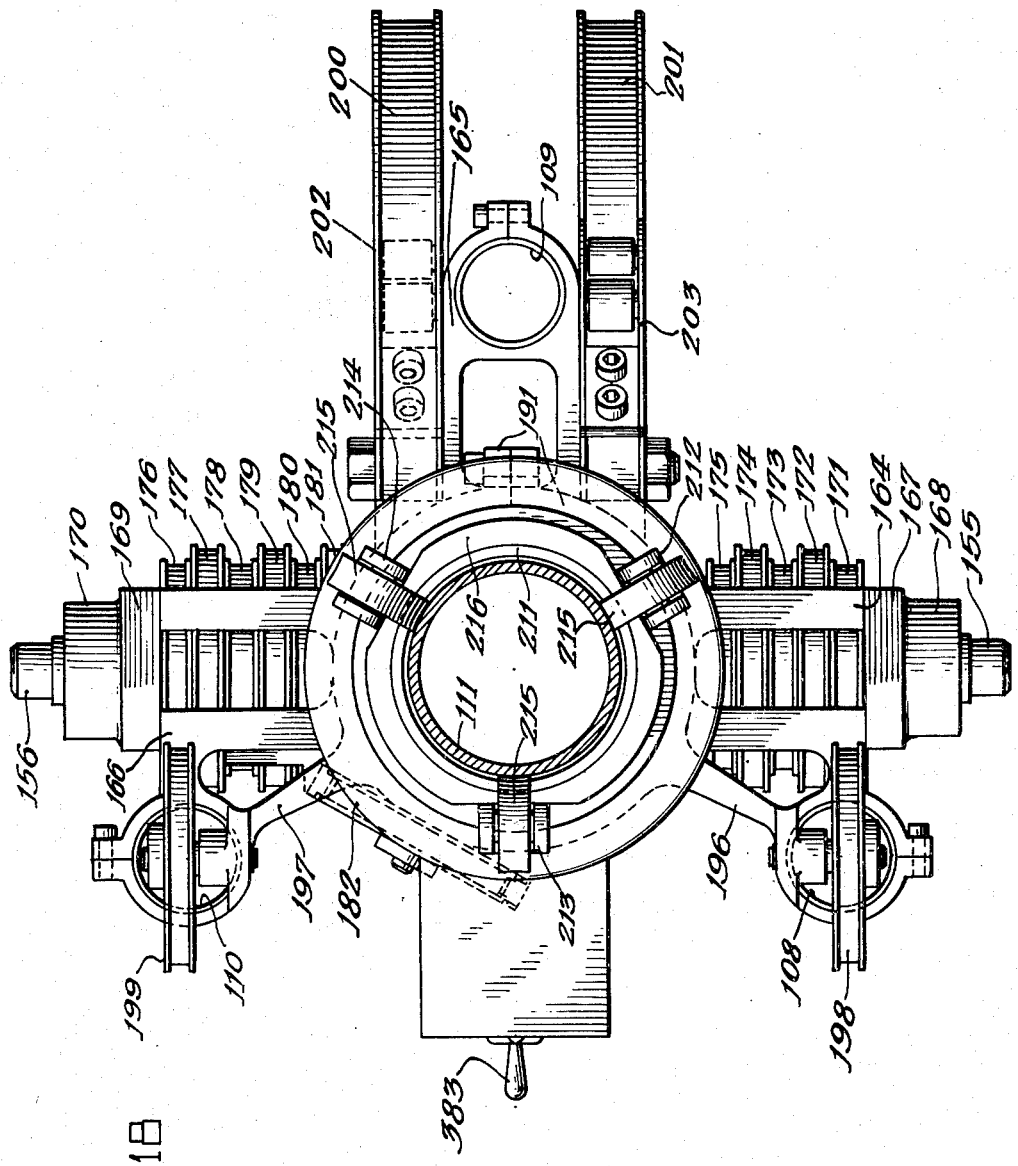

INVENTORS
Raymond C. Goertz
Roland G. Schmitt, Jr.
BY
Roland G. Anderson
Attorney Nov. 30, 1954 — R. C. GOERTZ ET AL — 2,695,715
REMOTE-CONTROL MANIPULATOR
Filed Feb. 6, 1953 — 22 Sheets-Sheet 11
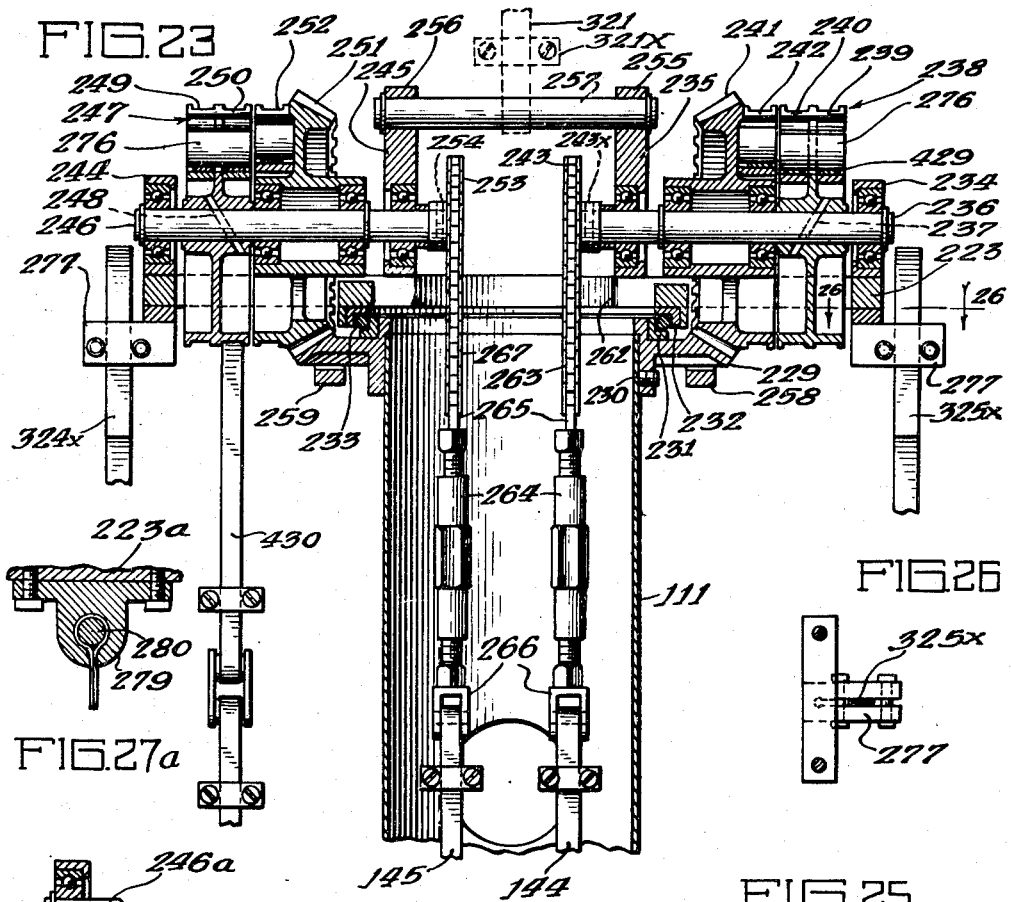
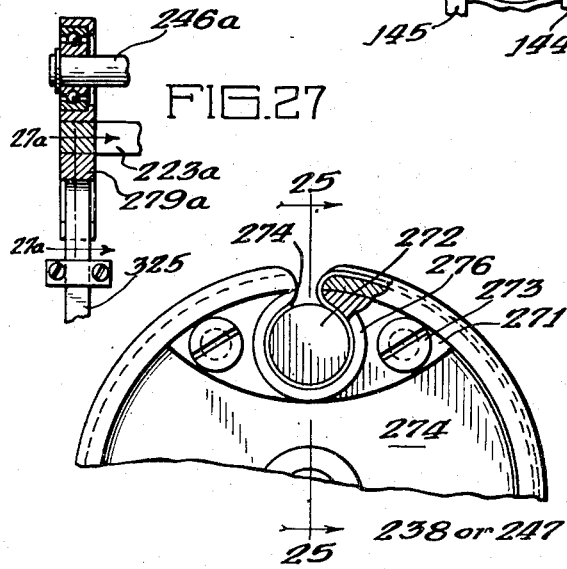
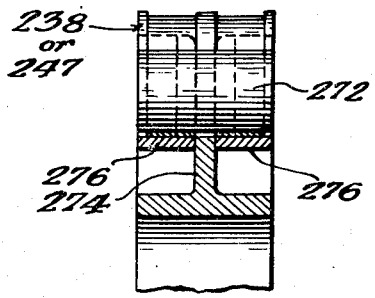
INVENTORS
Raymond C. Goertz
Roland G. Schmitt, Jr.
BY
Attorney Nov. 30, 1954 — R. C. GOERTZ ET AL — 2,695,715
REMOTE-CONTROL MANIPULATOR
Filed Feb. 6, 1953 — 22 Sheets-Sheet 12
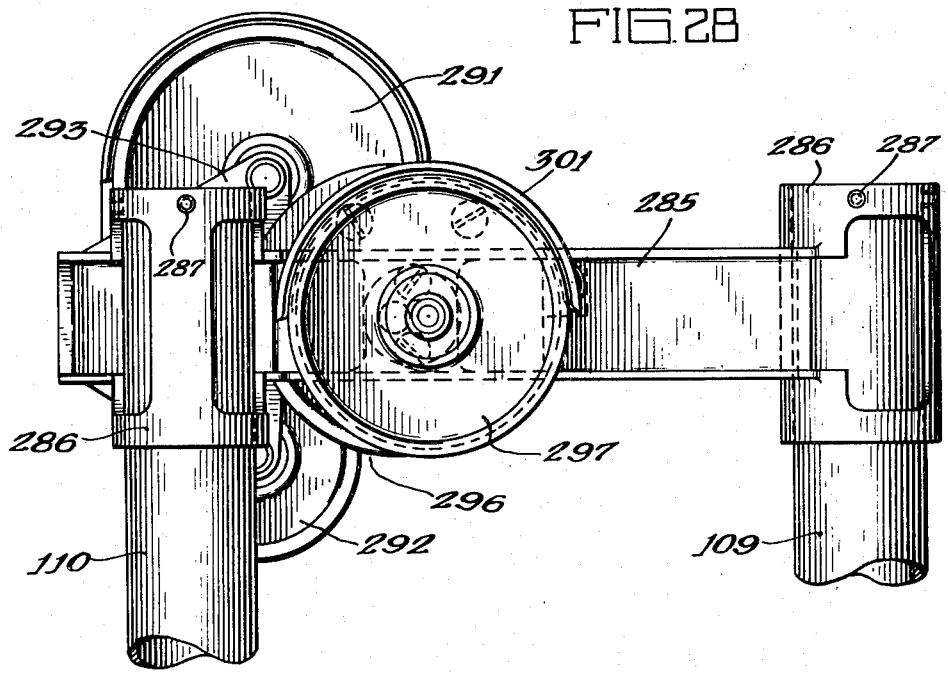
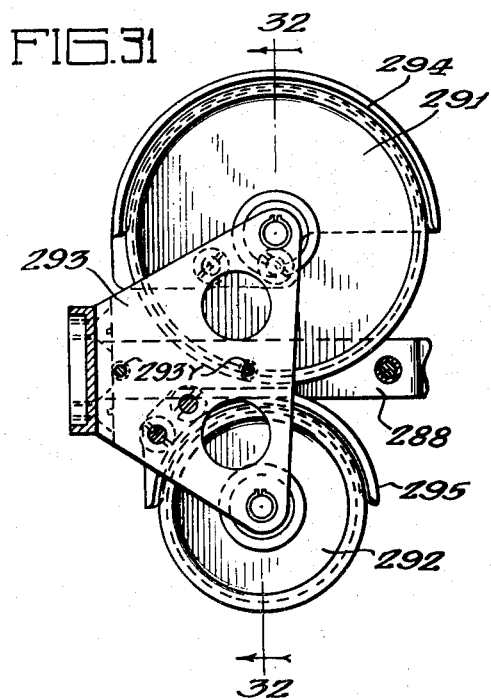
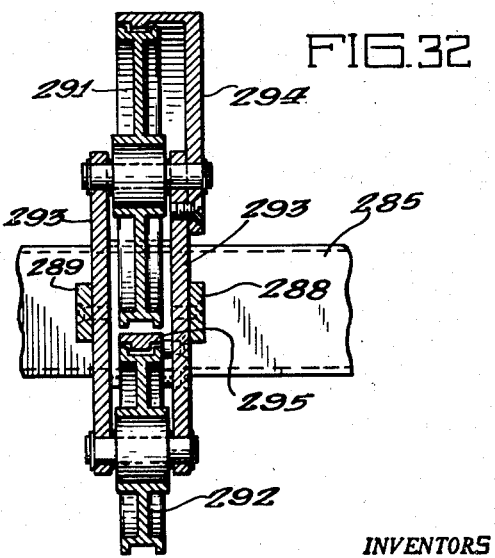
INVENTORS
Raymond C. Goertz
Roland G. Schmitt, Jr.
BY Roland A. Anderson
Attorney

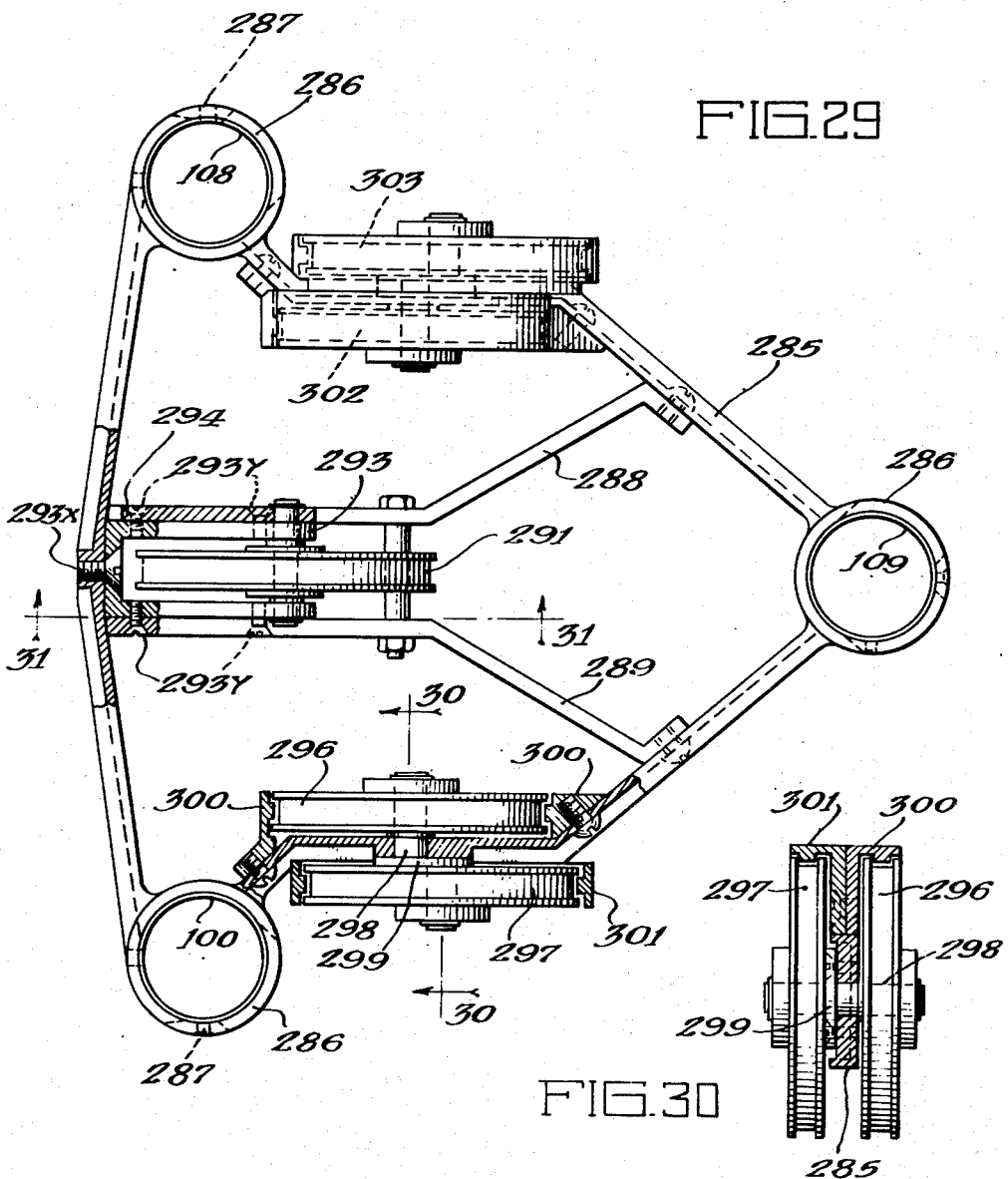

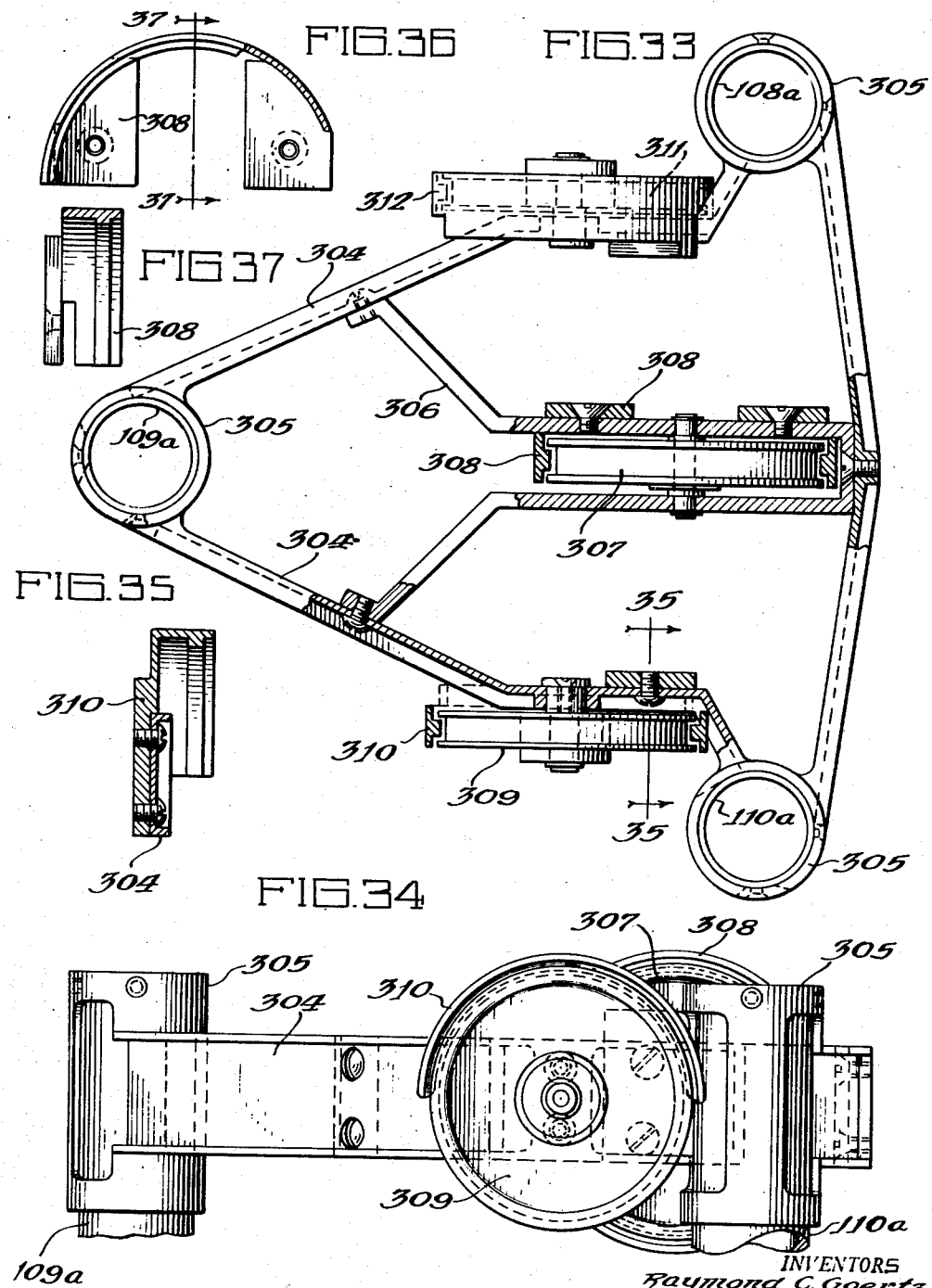

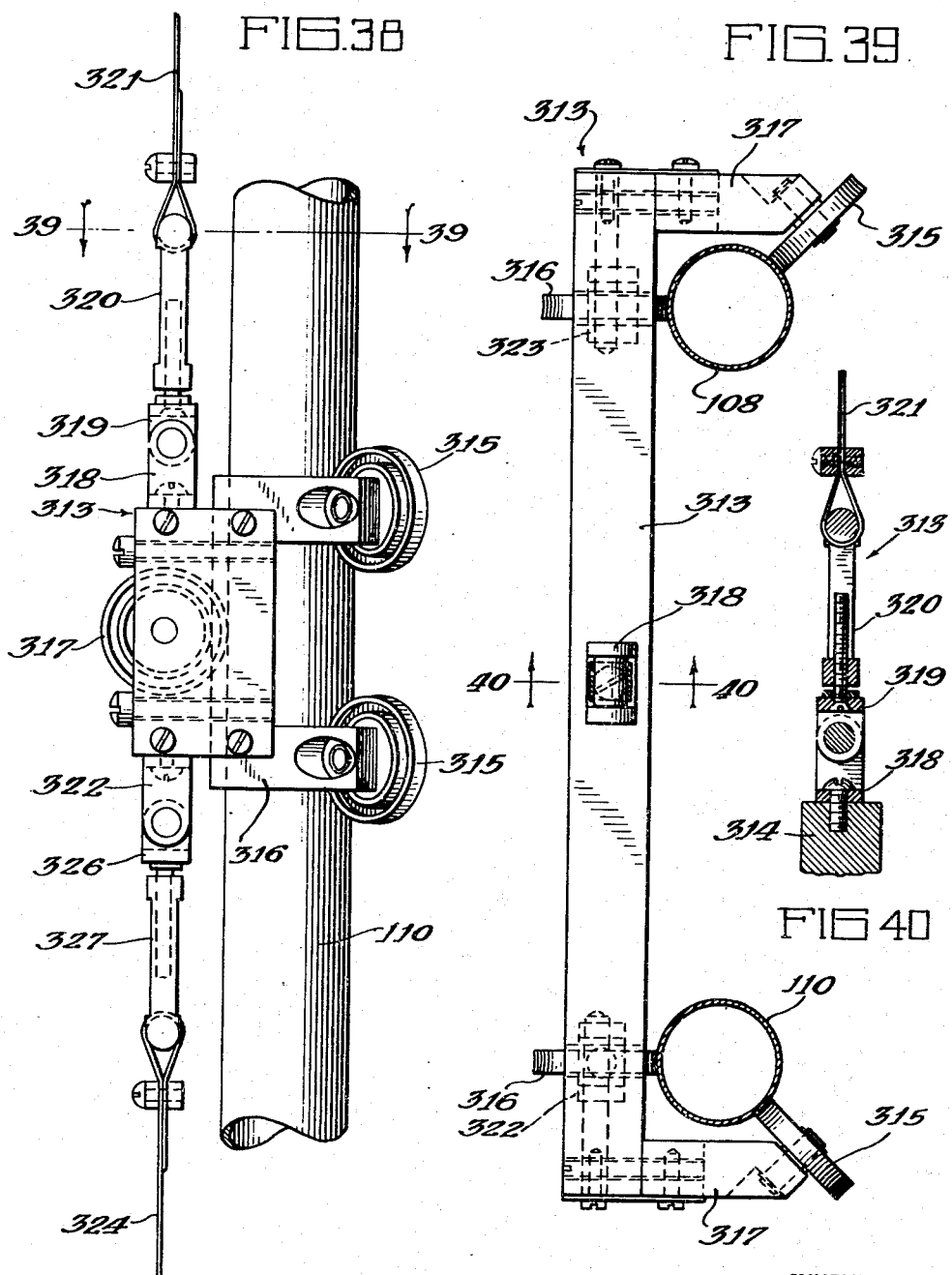

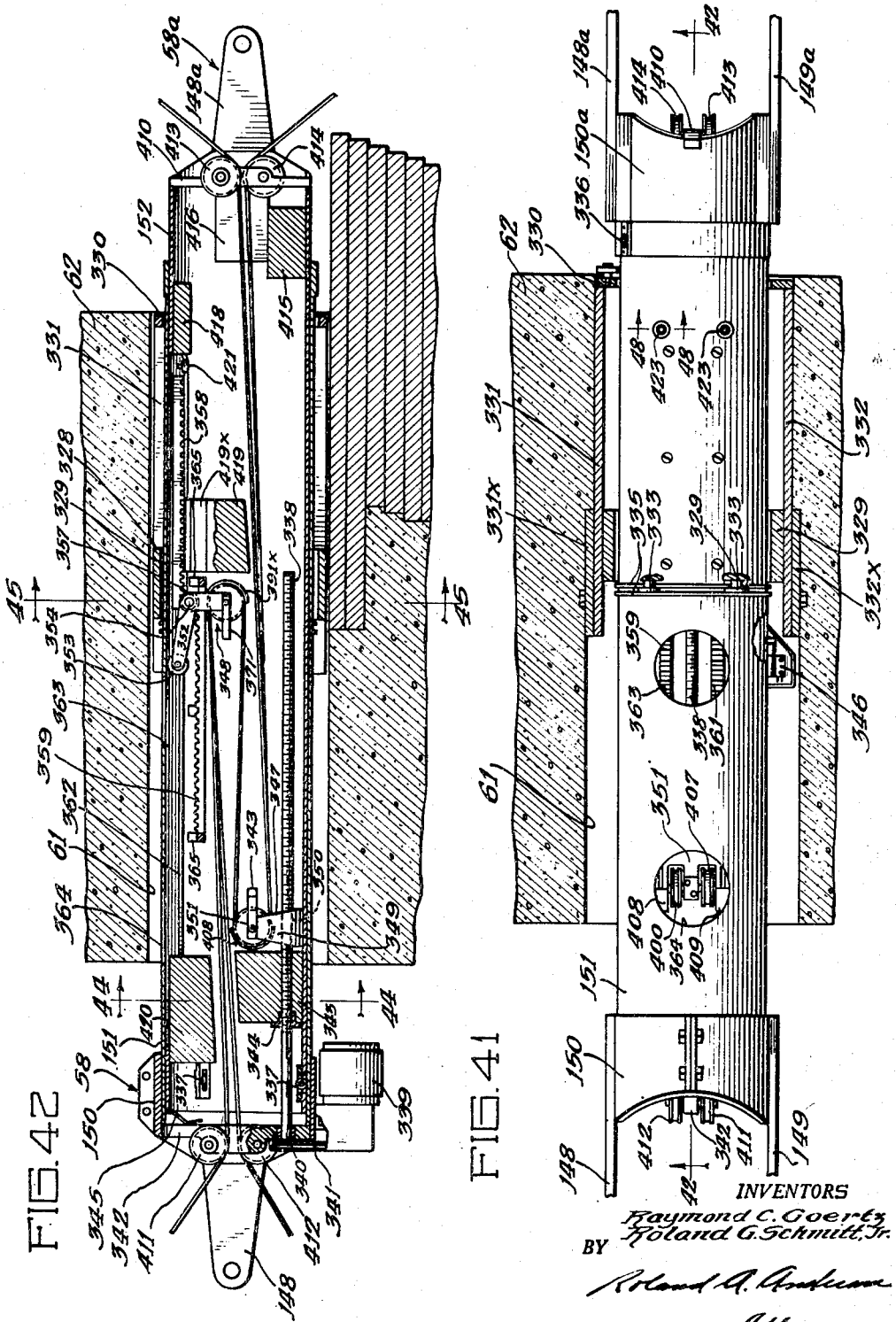

INVENTORS
Raymond C. Goertz,
Roland G. Schmitt, Jr.
BY
Roland A. Anderson
Attorney

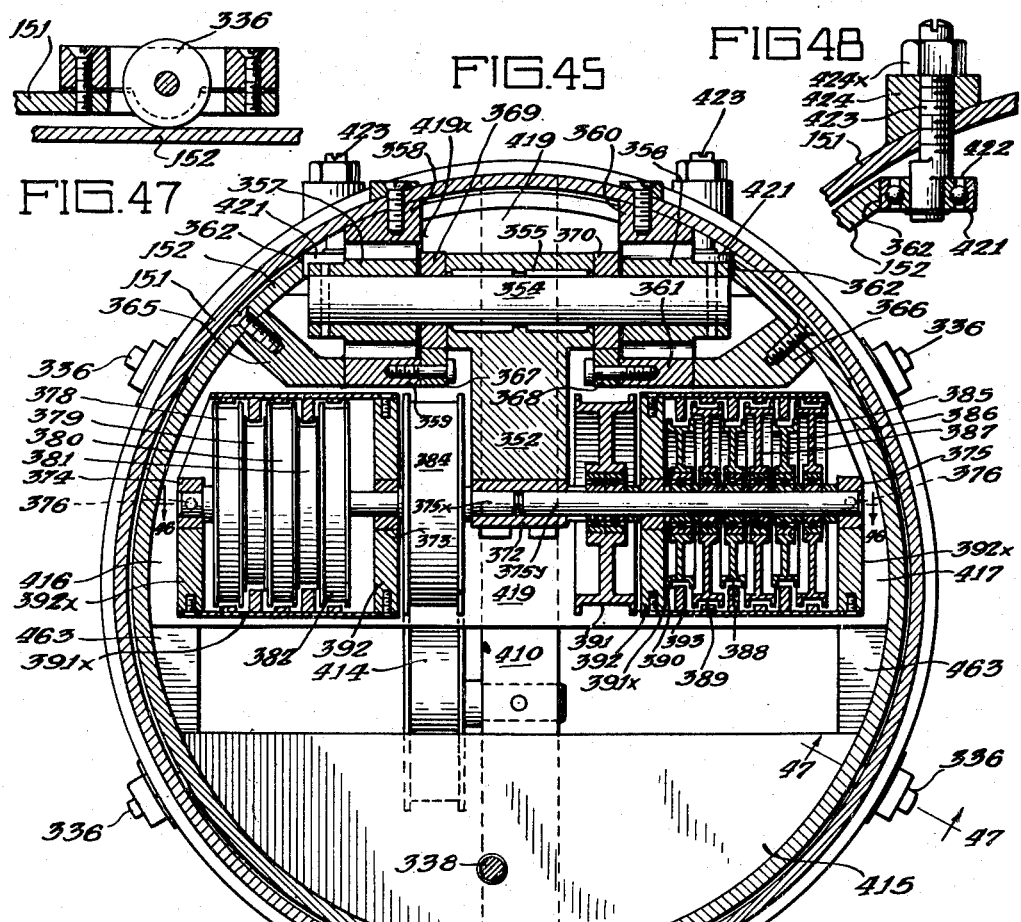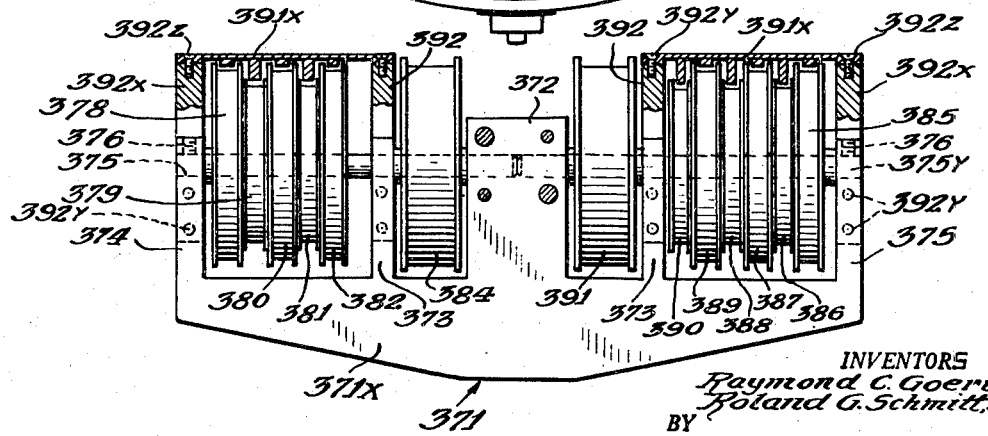

Nov. 30, 1954 — R. C. GOERTZ ET AL — 2,695,715
REMOTE-CONTROL MANIPULATOR
Filed Feb. 6, 1953 — 22 Sheets-Sheet 19

INVENTORS
Raymond C. Goertz
Roland G. Schmitt, Jr.
BY Roland A. Anderson
Attorney

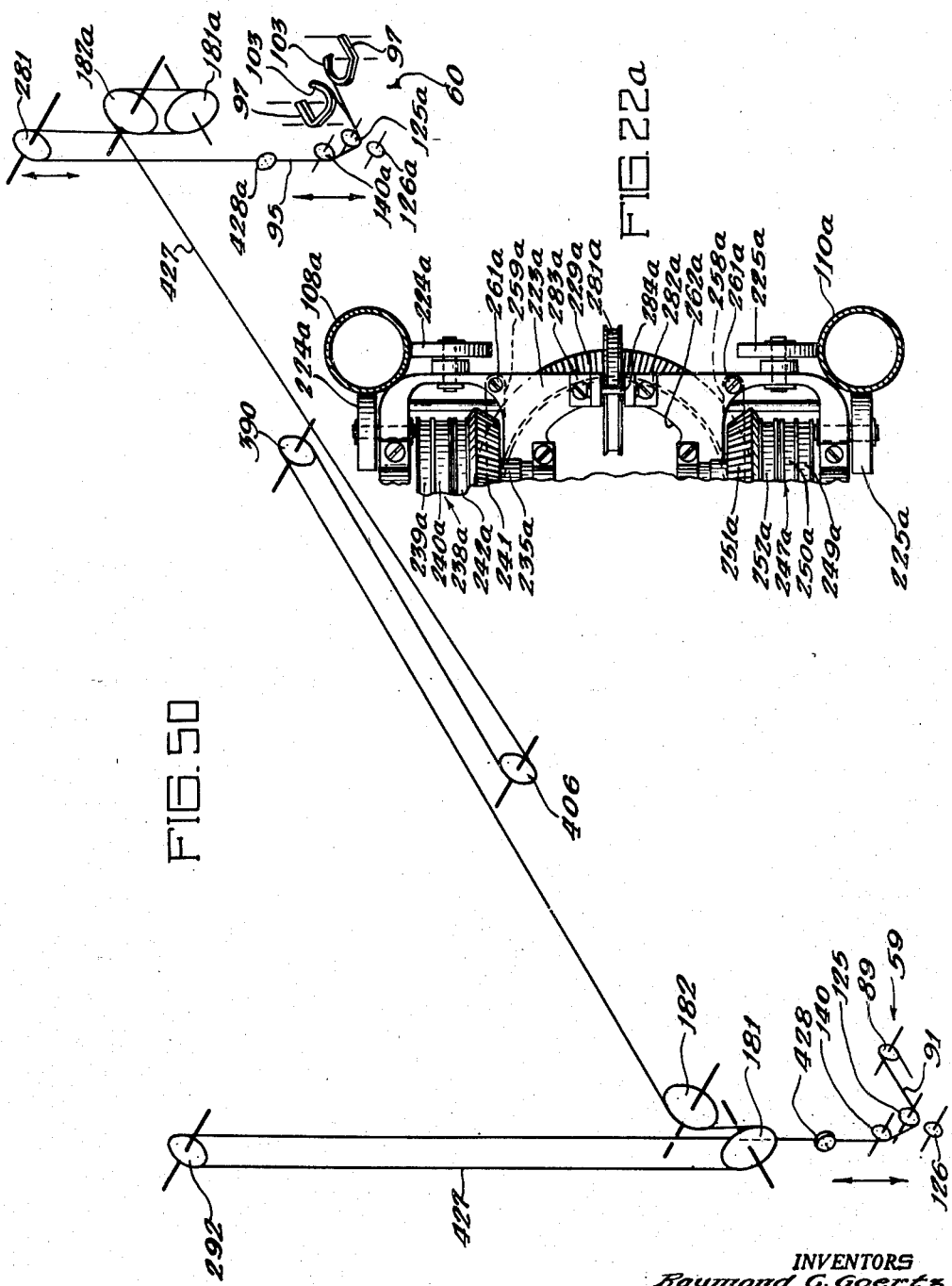

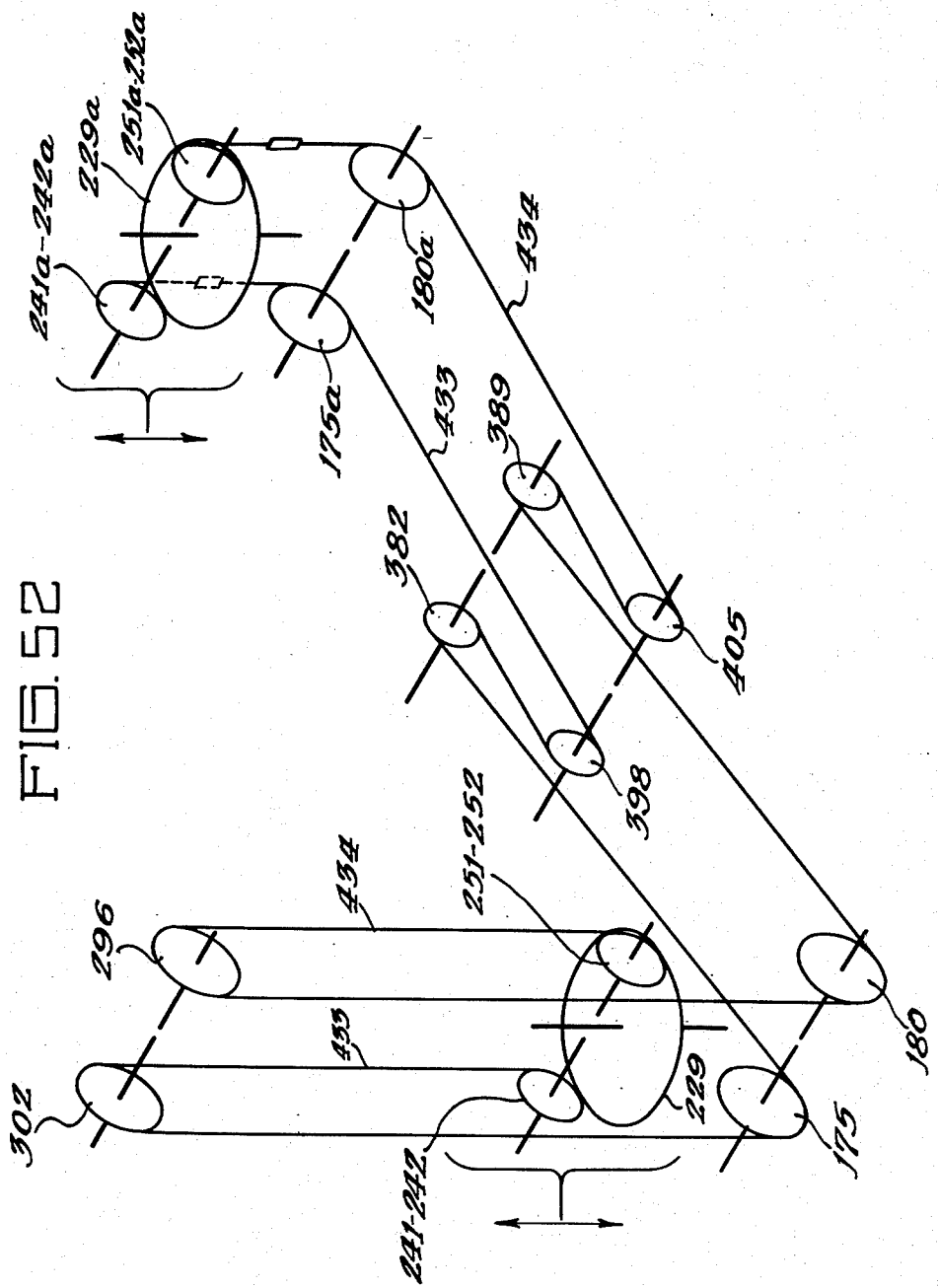

Nov. 30, 1954  R. C. GOERTZ ET AL  2,695,715
REMOTE-CONTROL MANIPULATOR
Filed Feb. 6, 1953  22 Sheets-Sheet 22
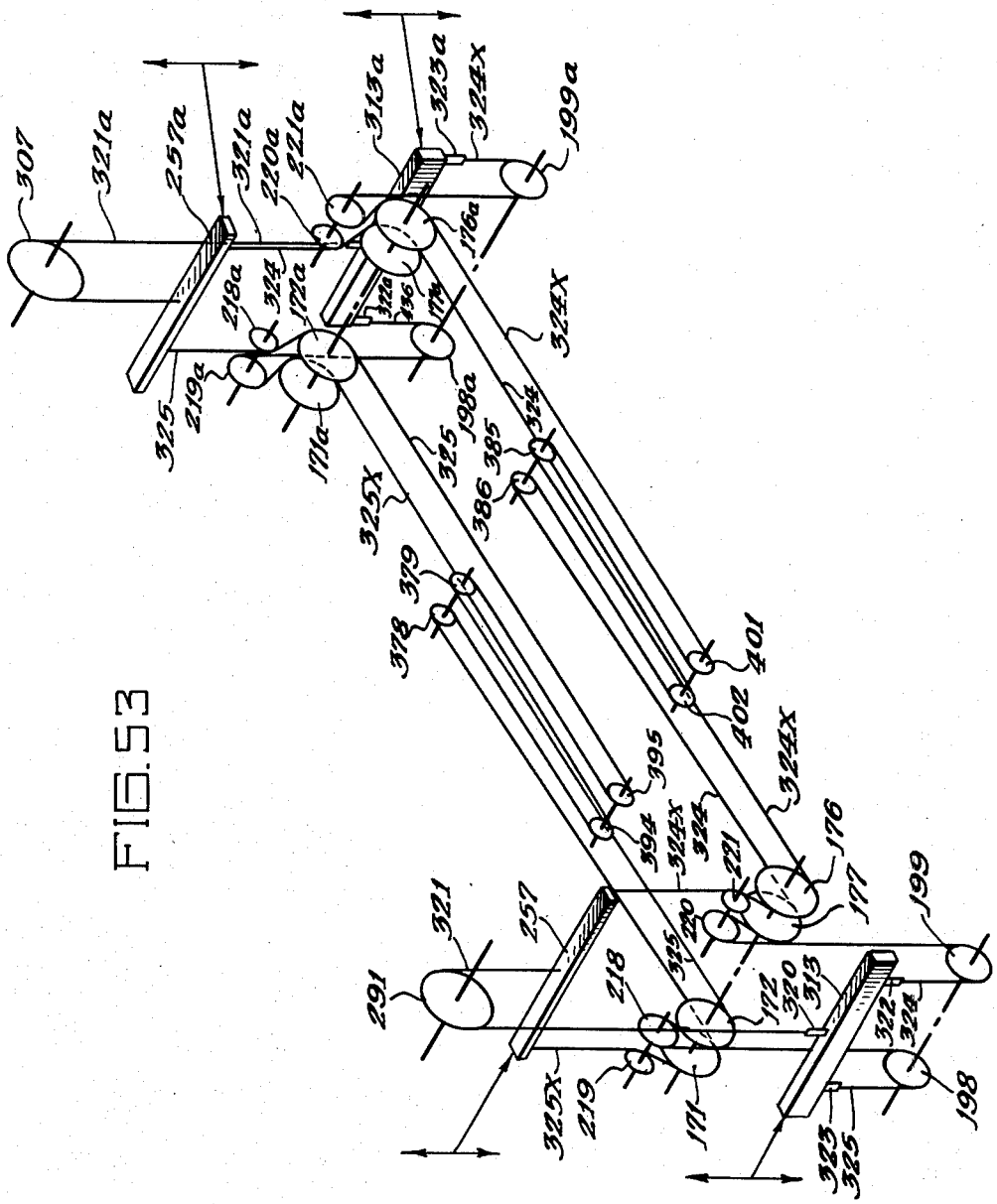
INVENTORS
Raymond C. Goertz
Roland O. Schmitt, Jr.
BY
Roland A. Anderson
Attorney:

United States Patent Office 2,695,715
Patented Nov. 30, 1954

2,695,715

REMOTE-CONTROL MANIPULATOR

Raymond C. Goertz, Downers Grove, and Roland G. Schmitt, Jr., Naperville, Ill., assignors to the United States of America as represented by the United States Atomic Energy Commission Application February 6, 1953, Serial No. 335,454

16 Claims. (Cl. 214—1)

This invention relates to a device for mechanical manipulation and more particularly it pertains to a remote control manipulator.

The necessity of working with noxious materials, for example, radioactive substances, has promoted the development of remote control manipulators in order to safeguard persons from harmful eventualities. Many remote control manipulators are handled by a person located behind a protective wall and include portions that go through, over, or around the protective wall to connect a handle actuated by the operator at one side of the wall and a device to grasp the noxious material at the other side of the wall. A manipulator of this type is disclosed in Goertz Patent 2,632,574, dated March 24, 1953. Like that manipulator the present invention was developed to duplicate, as much as possible, the motions of the operator, namely, the motions of his fingers, hand, wrist, and arm. In addition, the present invention offers greater maneuverability as well as a more compact design, for which reason it is adapted to work with radioactive material having higher radiation activity.

The manipulator of the present invention is characterized by a localizing of the many connections between the arms on which the handle and the tool are mounted. These connections are all localized at the intermediate support on which the arms are mounted, and thus the mounting of the manipulator in a protective wall is simplified and the amount of space taken up by the intermediate support and the many connections is kept to a minimum. By virtue of this, the shielding at this region may be made relatively effective.

The present manipulator has seven types of movement six of which occur identically in the master or handle side and the slave or tool side of the manipulator. Five of these six movements are rotations of the handle and tool about two axes in the arms on which they are mounted and rotations of the arms about their own axes, about their pivot axes on the intermediate support that interconnects the arms, and about the axes of the intermediate support. The sixth movement of the handle and tool occurs longitudinally of the arms on which they are mounted. The seventh is movement of the tool with respect to the handle which increases the spacing between the arms carrying the handle and the tool. As a result of the above movements the manipulator has a high degree of effectiveness in handling material behind a shield.

The manipulator of the present invention is suitably balanced so that the arms thereof which are connected to one another so as to remain parallel in all positions will stay without outside help in any position to which they may be moved.

The present manipulator is also characterized by an actuating handle that is mounted in such a way that the operator, by wrist action, can easily swing the handle as may be required for swinging the grasper of the manipulator while maintaining the necessary grip on the handle for actuating it to open and close the grasper. The mountings of the handle and the grasper are such as to permit relatively high ranges of angular movement, and thus the effectiveness of the grasper is increased.

Other advantages of the present invention will be evident from the drawings and the description that follow.

In the drawings:

Fig. 1 is an elevational view, partly in section, of the manipulator of the present invention showing the manner in which it is mounted in a protective wall;

Fig. 2 is an elevational view of the handle of the manipulator;

Fig. 3 is a plan view of the handle;

Fig. 4 is a vertical sectional view taken on the line 4—4 of Fig. 3;

Fig. 5 is a plan view of the tool of the manipulator;

Fig. 6 is an elevational view of the tool;

Fig. 7 is a fragmentary plan view, partly in section, of a rocker arm which is part of the tool;

Fig. 8 is an elevational view of the gear assembly and housing connecting the handle with the rest of the manipulator;

Fig. 9 is a vertical sectional view, partly in elevation, taken on the line 9—9 of Fig. 8;

Fig. 10 is a vertical sectional view taken on the line 10—10 of Fig. 8;

Fig. 11 is a vertical sectional view taken on the line 11—11 of Fig. 9;

Fig. 12 is a horizontal sectional view taken on the line 12—12 of Fig. 11;

Fig. 13 is a fragmentary end elevation with parts broken away and in section, of an arm at the handle side of the manipulator;

Fig. 14 is a horizontal sectional view taken from above the line 14—14 of Fig. 13;

Fig. 15 is a fragmentary side elevation of the portions of the arm shown in Fig. 13;

Fig. 16 is a horizontal sectional view taken from above on the line 16—16 of Fig. 15;

Fig. 17 is a vertical sectional view taken on the line 17—17 of Fig. 16;

Fig. 18 is a horizontal sectional view taken from below on the line 18—18 of Fig. 15;

Fig. 19 is a fragmentary side elevation with parts broken away of the arm at the tool side of the manipulator;

Fig. 20 is a horizontal sectional view of the sleeve taken on the line 20—20 of Fig. 19;

Fig. 22a is a horizontal sectional view corresponding to Fig. 22 but taken at the tool side of the manipulator;

Fig. 23 is a vertical sectional view taken on the line 23—23 of Fig. 21;

Fig. 24 is a fragmentary elevational view, partly in section, of a portion of a drum included in the structure illustrated in Fig. 23;

Fig. 25 is a vertical sectional view taken on the line 25—25 of Fig. 24;

Fig. 26 is a fragmentary horizontal sectional view taken on the line 26—26 of Fig. 23 and showing a tape holder;

Fig. 27 is a fragmentary vertical sectional view of a tape holder employed with drum and gear assembly on the arm at the tool side of the manipulator;

Fig. 27a is a vertical sectional view taken on the line 27a—27a of Fig. 27;

Fig. 28 is a side elevation of the pulleys and the frame which are at the top part of the arm at the handle side of the manipulator;

Fig. 29 is a plan view, partly in section, of the pulleys and frame shown in Fig. 28;

Fig. 30 is a vertical sectional view taken on the line 30—30 of Fig. 29;

Fig. 31 is a vertical sectional view taken on the line 31—31 of Fig. 29;

Fig. 32 is a vertical sectional view taken on the line 32—32 of Fig. 31;

Fig. 33 is a plan view, partly in section, of the pulleys and frame forming part of the top of the arm at the tool side of the manipulator and corresponds to Fig. 28;

Fig. 34 is a side elevation of the pulleys and frame shown in Fig. 33;

Fig. 35 is a vertical sectional view, taken on the line 35—35 of Fig. 33;

Fig. 36 is an elevational view of one of the pulley guards, partly in section, employed with one of the pulleys shown in Fig. 33;

Fig. 37 is a vertical sectional view taken on the line 37—37 of Fig. 36;

Fig. 38 is a side elevation of the counterweight and associated parts forming part of the arm at the handle side of the manipulator;

Fig. 39 is a horizontal sectional view of the counterweight assembly taken on the line 39—39 of Fig. 38;

Fig. 40 is a vertical sectional view taken on the line 40—40 of Fig. 39;

Fig. 41 is a plan view, partly in section, of the telecopic tube assembly showing the manner in which it is mounted in a protective wall;

Fig. 42 is a vertical sectional view taken on the line 42—42 of Fig. 41;

Fig. 45 is an enlarged vertical sectional view of the telescopic tube assembly and one of the pulley banks therein, taken on the line 45—45 of Fig. 42;

Fig. 46 is a horizontal sectional view taken on the line 46—46 of Fig. 45, and shows a support for mounting a stand of pulleys in the telescopic tube assembly;

Fig. 47 is a fragmentary sectional view taken on the line 47—47 of Fig. 45, showing one of the rollers by which the tubes of the telescopic assembly are mounted one within the other;

Fig. 48 is a vertical sectional view of a roller taken on the line 48—48 of Fig. 45, showing a roller that prevents relative rotation between the tubes of the telescopic assembly;

Fig. 50 is a diagrammatic view of the arrangement in which the handle and tool of the manipulator are interconnected whereby actuation of the handle opens and closes the tongs;

Fig. 51 is a diagrammatic view of the arrangement by which rotations of the handle about its own two axes produce corresponding rotations of the tongs;

Fig. 52 is a diagrammatic view of the tapes and pulleys arrangement by which rotation of the handle about the longitudinal axis of its arm produces rotation of the tool about the longitudinal axis of its arm; and Fig. 53 is a diagrammatic view showing how the arms of the manipulator are counterweighted and how they are interconnected for conjoint movements along their own longitudinal axes.

Figure 21:
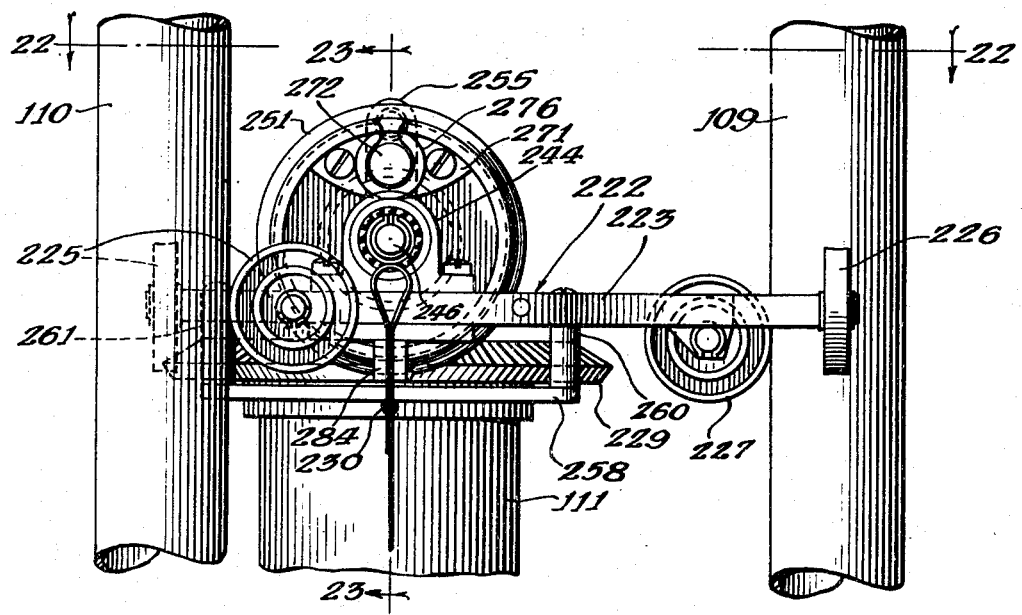
Fig. 21 is a fragmentary side elevation of drums, gears, and a frame on the arm at the handle side of the manipulator.

As shown in Fig. 1, the manipulator constituting the embodiment of the present invention comprises a telescopic tube assembly 55 and arms 56 and 56a pivoted at 57 and 57a, respectively, on yokes 58 and 58a secured to the ends of the telescopic assembly. At the lower end of the arm 56 is a handle 59, and at the lower end of the arm 56a is a tool 60, which takes the form of a grasper or tongs in the embodiment of the invention illustrated in the present application. Inasmuch as the telescopic tube assembly 55 is preferably disposed horizontally and the arms 56 and 56a are disposed generally vertically at the ends of the assembly, the arms and the assembly form a generally H-shaped structure. By virture of this construction the manipulator is adapted to be mounted in an aperture 61 in a protective wall 62 having a window 63 through which the operator of the manipulator may observe the movements of the tongs 60. Where the manipulator is used in a laboratory for handling bacteria or other noxious matter, the wall 62 and the window 63 may be confined to relatively thin cross sections. However, where the manipulator is used to handle radioactive material of very high radiations, endangering personnel due to the escape of harmful radioactive products, such as gamma radiation, the wall 62 must be constructed of radiation-absorbent material, such as concrete or iron, of proper thickness and the window 63 may be constructed of many laminated glass plates. Further precautions may be taken to absorb the radiation products in the vicinity of the aperture 61 by the use of laminated steel plates 65 on the lower side of the inner end of the aperture, whereby the products of radioactivity are absorbed by said plates when the tongs 60 holding a radioactive specimen are raised to a position near the plates. For covenience a fluorescent light tube 66 is placed beneath the plates adjacent the inner side of the wall 62.

The handle 59, shown in Figs. 2 and 3, includes a fitting 67 provided with a bore 68 and an integral angular extension 69. The fitting has a stem 70 extending from the portion 69 and a palm rest 71 extending from the stem 70. The fitting 67 also has a track 72 formed integral with the portion 69 and extending therefrom transversely to the stem 70 and the palm rest 71. The track is a channel member having an elongated slot 73 in the base thereof. Ears 74 and 75 extend in generally opposite directions from the central portion 69 and provide pivotal supports for the ends of levers 76 and 77 at 78 and 79. Each lever is composed at angularly related portions so that the levers may extend in generally opposite directions from their pivots 78 and 79 and then in generally parallel relation to accommodate the thumb and index and middle fingers of a human hand when the palm rest 71 is engaged by the palm at the side away from which the track 72 is disposed and the ring and little fingers may be wrapped around the palm rest. At the extremity of the lever 76 a finger grip 80 is provided for the middle and index fingers, and at the extremity of the lever 78 a thumb grip 81 is disposed. The particular handle described is adapted for a right hand because of the sides on which the finger grip 80 and the thumb grip 81 are disposed with respect to the palm rest 71. Clearly, these grips may be reversed together with their corresponding levers 76 and 78 in order to accommodate a left hand.

At the junctures of the angularly related portions of the levers, there are pivots 82 and 83, respectively, for the outer ends of links 84 and 85. The inner ends of the links are connected in a common pivot formed by a pin 86 which extends through the slot 73 in the track 72. As shown in Fig. 4, the inner end of the link 84 receiving the pin 86 is bifurcated and straddles the inner end of the link 85. The pin 86 serves as a slidable anchor for the links 84 and 85 in the track 72, and for this purpose, is provided at its lower extremity with a pair of rollers 87, which ride on the outside of the base of the track 72, and a ball bearing 88, which is engageable with the inside of the track. A pulley 89, which is positioned generally in the plane of the track but laterally displaced therefrom, is mounted on a support 90 which has a bifurcated extermity that straddles the bifurcated end of the lever 84 and is connected to the pin 86, as shown in Figs. 2 and 4. Over the pulley is disposed a cable 91 that enters the handle through the bore 68 in the fitting 67 and is anchored in a taper pin clamp 92 which is lodged within an aperture in the portion 69, as shown in Fig. 2. The cable 91 extends through the manipulator to the tongs 60 in a manner to be described hereinbelow. When the grips 80 and 81 are squeezed together, the pin 86 and the pulley 89 are moved to the right, as viewed in Fig. 3, along the slot 73. This motion causes the pulley 89 to draw the cable 91 to the right the result of which is to close the jaws of the tongs 60 at the other end of the manipulator.

The tongs 60, disposed at the lower end of the arm 56a, are shown in Figs. 5 and 6. The primary support for the tongs is provided by a frame 93 which is generally triangular in shape and has a sleeve 94 at the apex thereof. As shown in Fig. 6, the frame 93 is formed of spaced parallel portions that are joined by the sleeve 94. A cable 95 which is divided into two branches for purposes to be described hereinbelow, passes between said spaced frame portions and through the sleeve 94. The cable 95 and the cable 91 in the handle 59 are connected to one another as illustrated in Fig. 50, but description of the connection will be given later. The tongs 60 comprise essentially a pair of jaws 96 which have padding 96a and are connected to the frame 93 by means of parallel links 97 and 98 which give the jaws 96 individual parallel motion. For each jaw 96 there is a link 97 pivoted at 99 and 100 on the jaw 96 and the frame 93, respectively, and two links 98 having common pivots 101 and 102 on the jaw 96 and the frame 93, respectively. Each link 97 has an extension beyond its pivot point 99 within the frame 93, which extension is provided with a curved arm 103. The arm on a given link 97 has its center of curvature at the pivot 100 for the given link, and the arms are tangent to one another at a centerline 103x for the tongs 60, the region of tangency being within the frame 93, as shown in Fig. 5. Each arm 103 is provided with a cable groove 104 (Fig. 7) in its outer curved side for the purpose of retaining one of the two branches of the cable 95 over which said branch is disposed. The extremity of each branch of the cable 95 is anchored by a screw 105 to the extremity of one of the arms 103. A pull applied to the branches of the cable 95 to the right, as viewed in Fig. 5, will cause the arms 103 to roll over their corresponding contact surfaces causing the padded jaws 96 to approach each other in parallel positions as indicated in the dash-dot position in Fig. 5. A return spring 106 is disposed over the links 97 to promote the opening of the jaws upon release of the force upon the cable 95.

With the exception of the handle 59, the tool 60, and certain other parts that will be described later, the manipulator 50 has identical parts disposed at each end of the tube assembly 55. Consequently, the handle side will be described with reference numbers and the tool side will be given duplicate numbers with the latter $a$ appended, it being understood that a description of one is a description of the other and that the parts are interchangeable.

As shown in Figs. 13 and 15, the arm 56 comprises a sleeve 107, three tubular guides 108, 109, and 110, and a boom tube 111. The tubular guides are fixed parallel to the sleeve 107 and extend upwardly therefrom, the tubular guides 108 and 110 also extending for short distances below the guide 109. The boom tube 111 is mounted in the sleeve 107 and is movable longitudinally therein as well as rotatably.

The manner in which the handle 59 and the tongs 60 are attached to the lower ends of the boom tubes 111 and 111a, respectively, is shown in Figs. 8 through 12. Referring to Figs. 8 and 9, at the lower end of the boom tube 111 a ring 112 is attached to which a pair of oppositely disposed perforated side plates 113 and 114 are secured by screws at 115. The plates 113 and 114 constitute a wrist member within which operating parts are supported and disposed to receive and transfer motions from and to the handle or tongs. The lower ends of the plates 113 and 114 are rounded and are provided with oppositely disposed bearing brackets 116 and 117 integral therewith. In the brackets are disposed similar bearings 118 and 119 in which are mounted oppositely disposed gear wheels 120 and 121, respectively (Fig. 9). Integral with the gear wheels 120 and 121 are drums 122 and 123, respectively, on the side of each wheel adjacent to the corresponding side plate 113 or 114. Between the gear wheels is a yoke 124 in which are mounted two pulleys 125 and 126, between which the cable 91 of the handle 59 is disposed, as shown in Fig. 11. The yoke 124 is sustained in position by means of trunnions 127 extending from opposite sides thereof and mounted in bearings 128 within the center of the gear wheels 120 and 121. Another part of the yoke 124 is a shaft 129 that extends in a direction normal to the axis of the trunnions 127. The shaft 129 or 129a is hollow in order to accommodate the cable 91 or 95 and is aligned with the space between the pulleys 125 and 126 through which said cables operate. A differential gear 130 engages the bevel gears 120 and 121 and is mounted on the shaft 129 by means of spaced bearings 131, one of which is located in the free end of a sleeve 132 formed integral with the gear 130. The gear is held in position on the shaft 129 by means of the bearings 131, a shoulder 132x, and a retaining ring 133 on the shaft 129. The retaining ring engages the one bearing 131 and holds the other bearing 131 against the shoulder 132x. To the sleeve 132 or 132a is attached by set screw 133x either the fitting 67 of the handle 59 (Fig. 2) or the sleeve 94 of the tongs 60 (Figs. 5 and 6). Pulleys 134 and 135 are arranged generally above the drums 122 and 123, respectively, in transverse alignment therewith on a shaft 136. Similarly, pulleys 137 and 138 are mounted on a shaft 139 in transverse alignment with pulleys 134 and 135, respectively, at a higher level than pulleys 134 and 135. The shafts 136 and 139 extend through the plates 113 and 114 and support the pulleys 137 and 138, respectively, by means of bearings such as a bearing 139x, which is illustrated in Fig. 10 as supporting the pulley 135 on the shaft 136. Between and generally above the pulleys 137 and 138 is a pulley 140 which is in transverse alignment with pulleys 125 and 126. The pulley 140 is mounted by a pin 141 in a yoke 142 which is integral with the lower portion of the ring 112, as shown in Figs. 11 and 12. At the ends of the yoke is a retaining pin 143 the purpose of which is to hold cables against the pulley 140.

Because of the particular construction set forth in the preceding paragraph it is possible to introduce into the manipulator the several motions of which the human hand and wrist are capable, either separately or simultaneously. A given motion may be put into the manipulator by the handle 59 on one side and duplicated by the tongs 60 on the other side. Accordingly, if the handle 59 is rotated about the axis of the trunnion 127, the pinion 130 engaging both gear wheels 120 and 121 rotates said wheels together with their associated drums 122 and 123 in the same direction. On the other hand, if the handle is rotated about the axis of the shaft 129 the pinion 130 rotates the drums 122 and 123 in opposite directions. By connecting drums 122 and 123 to the corresponding drums 122a and 123a on the other side of the manipulator through tapes 144 and 145, it is possible to rotate the tongs 60 either about the axis of the trunnion 127a or about that of the shaft 129a. Tape 144 engages the drum 122 and passes over the pulleys 134 and 137, as shown in Figs. 8 and 11, and then goes through the boom tube 111, the telescopic assembly 55, the boom tube 111a and over the pulleys 134a and 137a into engagement with the drum 122a. Tape 145 engages the drum 123 and passes over the pulleys 135 and 138 and then through the boom tubes and telescopic assembly and over the pulleys 135a and 138a into engagement with the drum 123a. In order to prevent slipping of the tapes over the surfaces of the pulleys 122 and 123 each of tapes 144 and 145 is split into two segments the adjacent ends of which are attached to a tape anchor 145x located in each of the drums 122 and 123. For this purpose each drum surface is provided with an opening 146 through which the ends of the segments of each tape pass before being looped around and anchored to one tape anchor 145x. The tape anchors 145x are fashioned into units that are secured to the webs of the gear wheels at the openings 146 by means of screws 147. Finally, a third rotational movement is created in the manipulator by rotating the handle 59 about the longitudinal axis of the boom tube 111 with respect to the sleeve 107 in which it is mounted for either rotational or longitudinal movement therein. By means of tapes and pulleys to be described more fully hereinbelow the rotational and longitudinal movements of the boom tube 111 can be transmitted to the boom tube 111a where they are duplicated with precision.

It was pointed out above that the arms 56 and 56a are mounted within the yokes 58 and 58a, respectively. As shown in Fig. 41, the yoke 58 consists of two side pieces 148 and 149 and a circular clamp 150. The clamp is secured to one end of an outer tube 151 which together with an inner tube 152 forms the telescopic tube assembly 55. The outer and inner tubes are shown more clearly in Figs. 42 and 45 and will be described in detail below. The yoke 58a at the other end of the telescopic assembly 55 includes corresponding side pieces 148a and 149a and clamp 150a which is attached to the end of the inner tube 152 remote from the aforementioned end of the outer tube 151.

The sleeve 107 is sustained in the side pieces 148 and 149 of the yoke 58 on the pivot 57 which is formed by apertures in the side pieces and opposed pivots 55 on each yoke member 148 and 149. These pivots are formed by apertures in said yoke members and opposed projections 155 and 156 (Fig. 13) which are received in the apertures. The pivot projections are spaced from the sleeve 107 at opposite sides thereof and are actually disposed at the outer ends of pulley shafts 157 and 158, respectively. Each pulley shaft extends in opposite directions from the sleeve 107 and perpendicular to the axis thereof. For the purpose of support the sleeve is fixed within an upper bracket 159 and a lower bracket 160, above and below the shafts 157 and 158 as shown in Fig. 13. The upper bracket 159 includes three radial portions 161, 162, and 163 (Figs. 13, 15, and 16), of which the portions 161 and 163 are disposed directly over the shafts 157 and 158, respectively. The portion 162 extends perpendicularly of the other portions toward the center of the manipulator. In a similar manner the lower bracket 160 consists of three radial portions 164, 165, and 166 (Figs. 13, 15, and 18) which are parallel with the upper bracket portions 161, 162, and 163, respectively below the shafts 157 and 158, as shown in Fig. 13. Between the extremities of the portions 161 and 164 on one side of the sleeve 107 is a side plate 167 (Figs. 13 and 14) which is provided with a hub portion 168 centrally thereof through which portion extends the shaft 157. In a similar manner a side plate 169 is disposed between the extremities of the radial portions 163 and 166, on the other side of the sleeve 107, which plate is likewise provided with a hub portion 170 which receives the pulley shaft 158. The inner ends of the shafts 157 and 158 are supported in apertures in the sleeve 107. The plates 167 and 169 sustain the weight of the arm 53 and, in turn, are suspended by the pivot projections 155 and 156 in the yoke 58.

Between the side plate 167 and the sleeve 107 (Figs. 13 and 14) is disposed a bank of five pulleys 171, 172, 173, 174, and 175 on the pulley shaft 157. Likewise, a bank of six pulleys 176, 177, 178, 179, 180, and 181 is disposed on the pulley shaft 158 between the side plate 169 and the sleeve 107. Alternate pulleys in each pulley bank have smaller diameters than adjacent pulleys so that the tapes that run over the pulleys will not interfere with one another. An additional pulley 182 is attached to the lower bracket 160 at an oblique angle to the pulleys of the aforementioned bank with the midpoint of its edge on a line passing through the midpoint of the edge of the pulley 181 and parallel to the axis of the sleeve 107 whereby a tape may extend between pulleys 181 and 182.

In addition to providing support for the sleeve 107, the upper bracket 159 supports the guide tubes 108, 109, and 110 by means of a brace 183 on the radial portion 161 and of a brace 184 on the radial portion 163, as shown in Fig. 16. The braces 183 and 184 are provided with circular segments 185 and 186, respectively, in which the tubes 108 and 110 are mounted, respectively. Bolts 187 and nuts 188 in the tubes 108 and 110 attach the braces 183 and 184 to the tubes. Further, as shown in Figs. 13 and 16, the radial portion 162 supports the tube 109 by means of a clamp 189. As shown in Figs. 13 and 14, the lower end of the tube 109 is similarly supported in a clamp 190 on the radial portion 165 of the lower bracket 160. Below the lower bracket 160, as shown in Figs. 13 and 14, a clamp 191 is fixed to the sleeve 107 and is provided with two braces 192 and 193 extending radially therefrom and spaced 120° from each other for the purpose of supporting the lower ends of the tubes 108 and 110 by means of clamps 194 and 195, respectively, on said braces. Below the clamps 194 and 195 the clamp 191 has two bracket portions 196 and 197, respectively, which mount pulleys 198 and 199. Finally, a pair of take-up devices 200 and 201, which take the form of drum segments in the embodiment of the invention shown in the present application, are attached to and between the arms 162 and 165 of the upper and lower brackets 159 and 160 at opposite sides of the arms so as to occupy spaced parallel positions. The radial portions 162 and 165 and the drum segment 201 are bolted to the opposite sides of said radial portions whereby they are fixed in parallel positions. As shown in Figs. 13, 15, and 16, a tape anchor 202 is attached to the upper end of the drum segment 200, and a tape anchor 203 is attached to the lower end of the drum segment 201. The drum segments are, broadly speaking, take-up devices, because tapes that will be described later are taken up by being partially wound over them.

The boom tube 111 is centrally mounted within the sleeve 107 by means disposed at the upper and lower end of the sleeve, as shown in Fig. 13. At the lower extremity of the sleeve 107 the inner surface is counterbored at 204 in order to receive a pair of ball bearings 205 and 206 in which is disposed a swivel tube 207 having upper and lower shoulders 208 and 209 adjacent the bearings 205 and 206, respectively. The assembly of the swivel tube and the bearings is sustained in place by means of a retaining ring 210 which is attached to the lower extremity of the tube 107. Attached to the ring 210 is a support ring 211 to which are attached three roller brackets 212, 213, and 214 which are spaced from each other by 120° intervals (Fig. 18). Each bracket supports similar rollers 215 which together with the swivel tube 207 help to sustain the boom tube 111 centrally within the sleeve 107. On the exterior surface of the sleeve 107 is an annular weight 216.

Additional pulleys are attached to the side plates 167 and 169, as shown in Figs. 13 and 15. These include a pulley 217 separately mounted on the side plate 167 and a pair of pulleys 218 and 219 mounted thereon below pulley 217 and out of transverse alignment therewith. These pulleys are disposed above the bank of pulleys on the pulley shaft 157 and have axes parallel to that of the pulley bank. Likewise, on the side plate 169 a pulley 219x and a pair of pulleys 220 and 221 are mounted in a position above the bank of pulleys on the pulley shaft 158 in a manner similar and opposite to the pulleys 217, 218, and 219.

Figure 22:
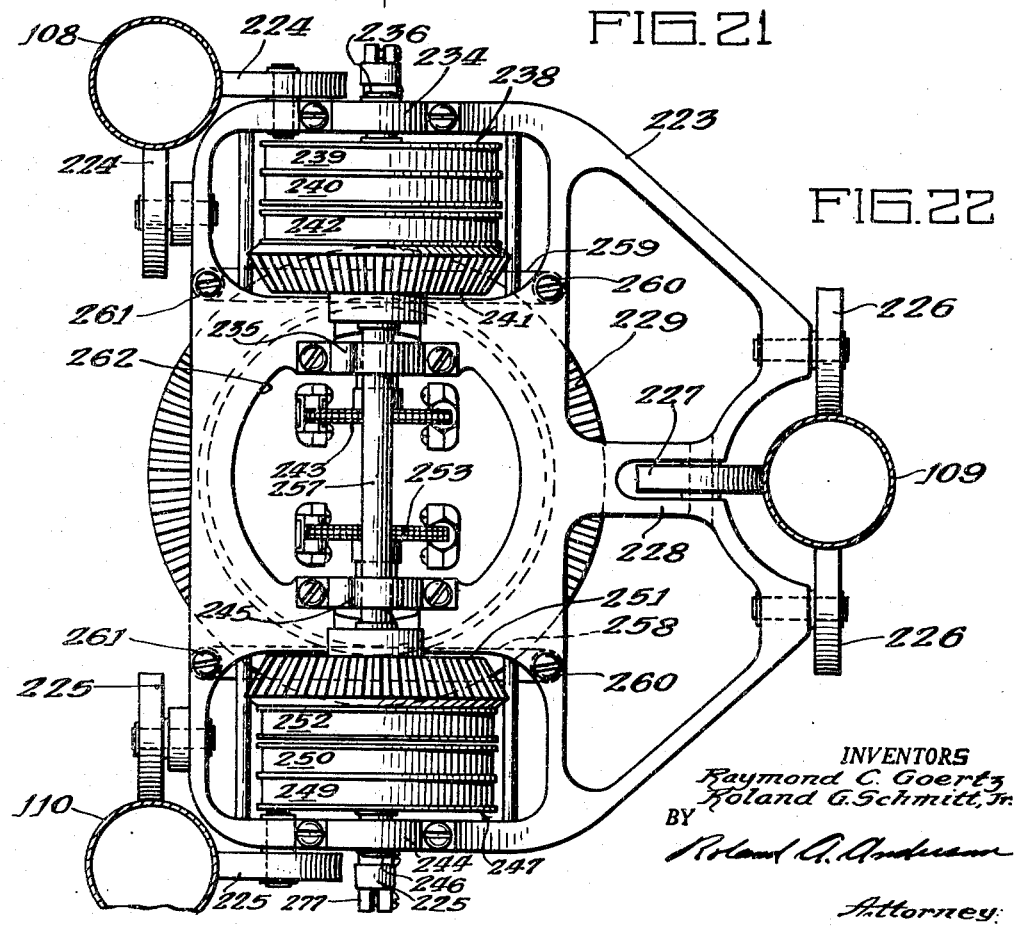
Fig. 22 is a horizontal sectional view taken on the line 22—22 of Fig. 21.

The upper end of the boom tube is centrally disposed within the sleeve 107 by means of a carriage generally indicated at 222, as shown in Figs. 21 and 22. The carriage comprises a frame 223 of irregular configuration which lies in a horizontal plane between the tubular guides 108, 109, and 110. The frame 223 moves up and down with respect to said tapes as the boom tube 111 is raised and lowered. The spacing between the frame and the tubular guides is maintained by means of rollers, as shown in Fig. 22. Accordingly, at the corner of the frame 223 adjacent the guide tube 108 two rollers 224 are mounted on the frame in planes normal to each other so as to contact two sides of said guide tube. Similarly, two rollers 225 are mounted normal to one another at another corner of the frame 223 in contact with the guide tube 110. At the guide tube 109, three rollers are used including a pair of rollers 226 lying in the same plane and contacting opposite sides of the guide tube, and a single roller 227 mounted normal to the rollers 226 within a yoke portion 228 of the frame 223. All of said rollers 224 through 227, inclusive, are mounted on anti-friction bearings in a conventional manner. By virtue of this construction it is apparent that the carriage 222 is movable vertically without any lateral shifting. It is necessary that the top of the boom tube 111 be rigidly supported by the carriage to provide complete stabilization of the boom tube 111, in the sleeve 107, for otherwise only some intermediate region of the boom tube is supported in the lower end of the sleeve 107 in the manner shown at the bottom of Fig. 13. An annular bevel gear 229 is secured to the top extremity of the boom tube 111 where it is retained by means of a number of set screws 230. As shown in Fig. 23, the central portion of the frame 223 is disposed over the top of the boom tube and the bevel gear, where it is sustained by means of an annular race 231 attached to the top surface of the bevel gear and an annular race 232 attached to the undersurface of the frame. Between the races are a plurality of ball bearings 233. Referring to Figs. 22 and 23, a pillow block 234 is mounted on the upper surface of the frame 223 adjacent one roller 224, and a pillow block 235 aligned with the block 234 is mounted on the frame near the central portion thereof. These pillow blocks serve to journal a pulley shaft 236 to which is attached, by means of a pin 237, a take-up device 238 in the form of a drum having two winding portions 239 and 240. A bevel gear 241 having a take-up device 242 in the form of a drum integral therewith is rotatably mounted on the shaft 236 between the drum 238 and the pillow block 235. A sprocket 243 is attached by means of a pin 243x to the shaft 236 on the side of pillow block 235 opposite the bevel gear 241. On the other side of the frame 223 there is a similar arrangement that includes a pillow block 244 adjacent the outside of the frame 223 and a pillow block 245 adjacent the center of the frame 223. The blocks 244 and 245 journal a pulley shaft 246. Likewise, a take-up device 247 in the form of a drum having two sections 249 and 250 is secured to the shaft 246 by a pin 248. In addition, a bevel gear 251 is rotatably mounted upon the shaft 246 and is provided with a take-up device 252 integral therewith. On the end of the shaft 246, on the side of the pillow block 245, remote from the gear 251, is a sprocket 253 secured thereto by a pin 254. The pillow blocks 235 and 245 are provided with vertical extensions 255 and 256, respectively, between which extends a bar 257.

In the event that the manipulator is overloaded, the gears 241 and 251 which engage the annular bevel gear 229 may tend to be ejected from engagement. Complete disengagement is prevented by means of two safety bars 258 and 259 underlying the lower surface of the gear 229 on opposite sides of the boom tube 111. Each bar is sustained in position by means of two spacer pins 260 and 261 which extend from the under surface of the frame 223 as shown in Figs. 21 and 22.

As shown in Figs. 22 and 23 the sprockets 243 and 253 are mounted over a central aperture 262 in the frame 223. Sprocket chains 263 and 267 are disposed over and engage the sprockets 243 and 253, respectively. The ends of the chains 263 and 267 are secured to the upper ends of the tape segments 144 and 145, the lower ends of which extend over and are anchored in the drums 122 and 123, as is shown for the tape 144 and the drum 122 in Fig. 11. Connections between the chain 263 and the tape 144 and between the chain 267 and the tape 145 are made through four turnbuckles 264, four pins 265, and four clevises 266. Only two of each of these are to be seen in Fig. 23. One pin 265 connects each turnbuckle 264 to an end of sprocket chain 243 or 253, and a clevis 266 connects each turnbuckle to an upper end of tape segment 144 or 145.

Referring to Figs. 23, 24, and 25, each of drums 238 and 247 is provided with a tape anchor that comprises two receiving elements 271 and a pin 272. The receiving elements 271 are secured by screws 273 to opposite sides of a web 274 of the drum 238 or 247 at an opening 274x in the drum surface. Each receiving element 271 has a circular flange 276 extending from and around a central opening. The pin 272 is positioned in the two flanges 276 to clamp tapes against them, which tapes are trained over the segments of the drum 238 or 247 and extend through the drum opening 274.

The foregoing description of the frame 223 together with the parts attached thereto is common to the frames 223 and 223a atop the boom tubes 111 and 111a, respectively. In addition, there are several parts which are not common to both frames. For the master or handle side of the manipulator, clamps 277 are attached to the underside of the frame 223 beneath the pillow blocks 244 and 234 but outward therefrom so as to secure the ends of tapes, to be described later outward of the frame 223. The clamps 277 are illustrated in Figs. 23 and 26. For the slave or tong side of the manipulator, tape anchors are provided directly under the pillow blocks 244a and 234a, as illustrated in Figs. 27 and 27a. Each of these tape anchors comprises an apertured member 279 and a pin 280 clamping a loop of a tape in the apertured member. As shown in Fig. 22a, the frame 223a at the tong side is provided with a pulley 281 mounted between a pair of brackets 282 and 283 that are secured to the top surface of the frame. The periphery of the pulley is over the aperture 262a of the frame between the sprockets 243a and 253a. A bar 284 is mounted directly above the pulley in the top of the brackets.

The tops of the guide tubes 108, 109, and 110 at the handle side of the manipulator are connected by a generally triangular bracket 285 (Figs. 28 and 29) having similar sockets 286 at the corners thereof in which the upper ends of the tubes are secured by means of set screws 287. The frame has in its central portion a pair of braces 288 and 289, as shown in Fig. 29, which provide support for a pulley 291 and a pulley 292. Both pulleys are mounted on and within a U-shaped bracket 293 which is attached to the frame 285 and braces 288 by means of screws 293x and 293y and which incidentally serves to secure the braces 288 to the frame 285. As shown in Fig. 31, the sides of the bracket 293 extend above and below the braces 288 and mount the pulley 291 above the pulley 292, the pulley 291 being larger than the pulley 292. The pulleys 291 and 292 are provided with guards 294 and 295, respectively, both of which are attached to one side of the bracket 293. The purpose of the pulley guards is to prevent the tapes passing over the pulleys from jumping out of their positions. On the portion of the frame 285 between the guide tubes 109 and 110 is a pair of pulleys 296 and 297 which are mounted on either side of said portion. It is to be noted that the pulleys are mounted out of axial alignment on the offset ends of a shaft 298 which extend from a common central portion 299 which is seated in the side of the frame 285 contiguous to the pulley 297, as shown in Figs. 29 and 30. The pulley 296 is provided with a pulley guard 300 and the pulley 297 is provided with a pulley guard 301, both of which guards are attached to the respective sides of the frame 285 on which the pulleys are located. In a similar manner, a pair of pulleys 302 and 303 are mounted out of axial alignment on the offset ends of a shaft secured to the portion of the frame 285 between the guide tubes 108 and 109 and are provided with pulley guards.

Figs. 33 and 34 show a generally triangular frame 304 for connecting the tops of the tubular guides 108a, 109a, and 110a at the tong side of the manipulator. The frame 304 has similar sockets 305 at its corners receiving the upper ends of said tubular guides. In the foregoing respects the frame 304 is similar to the frame 285 at the top of the guide tubes 108, 109, and 110. However, the frame 304 supports only three pulleys in which respect it differs from the frame 285 which supports five pulleys. The frame 304 is reinforced by a bifurcated brace 306 in the center thereof. Within the brace 306 is mounted a single pulley 307 that is provided with a pulley guard 308 secured to the brace 306. On the portion of the frame 304 between the guide tubes 109a and 110a is mounted a single pulley 309 which is provided with a guard 310 which is attached to the frame 304. A pulley 311 is similarly mounted on that portion of the frame 304 between the tubes 108a and 109a. This pulley is covered by a guard 312. The configurations of the pulley guards 308, 310, and 312 are shown in Figs. 35, 36, and 37.

In order to be prevented from dropping to their lowermost positions each time an operator of the manipulator releases the handle 59 from his hand, the boom tubes 111 and 111a are balanced by counterweights 313 and 313a, respectively, as shown in Figs. 1, 38, 39, and 40. The counterweight 313 is a bar extending transversely of the tubular guides 108 and 110 and is of an appropriate weight to counterbalance the weight of the boom tube 111 together with the appendages thereto. The bar 314 is adapted to move longitudinally of the guide tubes 108 and 110 for which reason it is provided at each end with a pair of rollers 315 and a single roller 316 in contact with the tubes 108 and 110. The rollers 315 are mounted in recesses in the bar 314 on axes generally parallel with the length of the bar 314. The rollers 315 of a given pair are mounted higher and lower than the associated roller 316 in a U-shaped bracket 317 on axes displaced about 45 degrees from that of the roller 316. The rollers 315 engage regions of the tube 108 or 110 displaced about 135 degrees about the tube from the regions engaged by the rollers 316. A clevis 318 is attached to a region of the weight 314 at a mid point in its length and is connected to a yoke 319 which, in turn, is connected to a turnbuckle 320 to which is attached one end of a tape 321. As shown in Fig. 53, the tape extends to the upper extremity thereof where it passes over the pulley 291 and thence downwardly to the bar 257 under which it is looped and held by a clamp 321x, as shown in Fig. 23. The counterweight 313a for the tong side of the manipulator also moves up and down on the tubes 108a and 110a on rollers. As shown in Fig. 53, a tape 321a is connected to a mid region of the counterweight 313a and extends up and around the pulley 307 on frame 304 (Fig. 33) and down to the bar 257a where it is attached.

As shown in Figs. 38 and 39, a pair of clevises 322 and 323 are attached to the undersurface of the counterweight bar 313 for the purpose of the attachment of two tapes 324 and 325, respectively, by means of a pair of yokes 326 and a pair of turnbuckles 327. The clevis 322 is attached to the bar 313 at a region beneath the roller 316 adjacent the guide tube 110, and the clevis 323 is attached at a region beneath the roller 316 adjacent the guide tube 108. As shown in Fig. 53, the tape 324 extends from the counterweight bar 313 over the pulleys 199, 220, and 177, through the telescopic tube assembly 55 and means therein to be described presently, and over the pulleys 177a and 220a to the frame 223a, where it is attached by one clamp 279—280 as shown in Figs. 23a and 26. Similarly, the tape 325 extends from the counterweight bar 313 over the pulleys 198, 218, and 172, through the telescopic tube assembly 55, and over the pulleys 172a and 218a to the frame 223a. Thus the tapes 324 and 325 connect the counterweight 313 at the handle side of the manipulator and the frame 223a at the tong side of the manipulator. Tapes 324x and 325x connect the counterweight 313a at the tong side of the manipulator with the frame 223 at the handle side of the manipulator but are outward of tapes 324 and 325, respectively. Thus the ends of tapes 324 and 325 are connected to the outwardly extending clamps 297 on the frame 223, and to regions of the counterweight bar 313a nearer its ends than the regions of the counterweight bar 313 at which the tapes 324 and 325 are connected to its ends. From the counterweight bar 313a the tape 324x passes over the pulleys 199a, 221a, and 176a, through the telescopic tube assembly 55, and over the pulleys 176 and 221 to the frame 223. The tape 325x passes from the counterweight 313a over the pulleys 198a, 219a, and 171a, through the telescopic tube assembly 55, and over the pulleys 171 and 219 to the frame 223.

As was stated above with respect to Fig. 1, the telescopic assembly 55 comprises the outer tube 151 and the inner tube 152. The tubes together with their internal parts are shown more clearly in Figs. 41 through 48. The outer tube 151 is stationary with respect to the longitudinal axis and is mounted through the aperture 61 of the wall 62 within a mounting frame generally indicated at 328 in Figs. 41 and 42. The frame consists of a rectangular end block 329, a rectangular end plate 330, long side plates 331 and 332, and short side plates 331x and 332x. The rectangular shapes of the end block 329 and the wall recess 61 may be seen in Fig. 43. The end plate 330 has generally the same shape, but this cannot be seen in Fig. 43, since the end plate lies behind the end block in Fig. 43. The wall recess 61 is also of rectangular sections of two different horizontal dimensions as viewed in Fig. 41. The end plate 330 fits the outer end of the small part of the wall recess 61, and the long side plates 331 and 332 extend from the end plate 330 along the vertical sides of the small part of the wall recess 61 and between the end block 330 and the short side plates 331x and 332x. The end block 330 and the short side plates 331x and 332x are located generally at a region of the wall recess 61 midway of its length and at the inner end of the large part of said wall recess. The plate 330 and the block 329 have generally circular openings somewhat larger than the exterior of the outer tube 151. Rollers 333 spaced about the periphery of the tube 151 are mounted on pins extending from the block parallel to the axis of the tube. A plurality of rollers 334 are similarly arranged and mounted on the apertured plate 330. As shown in Fig. 41, the rollers 333 and 334 sustain the outer tube 151 in position. A pair of circumferential ribs 335 are disposed about the outer surface of the tube 151 to provide a groove for the rollers 333, whereby longitudinal movement of said tube is inhibited.

Figure 43:
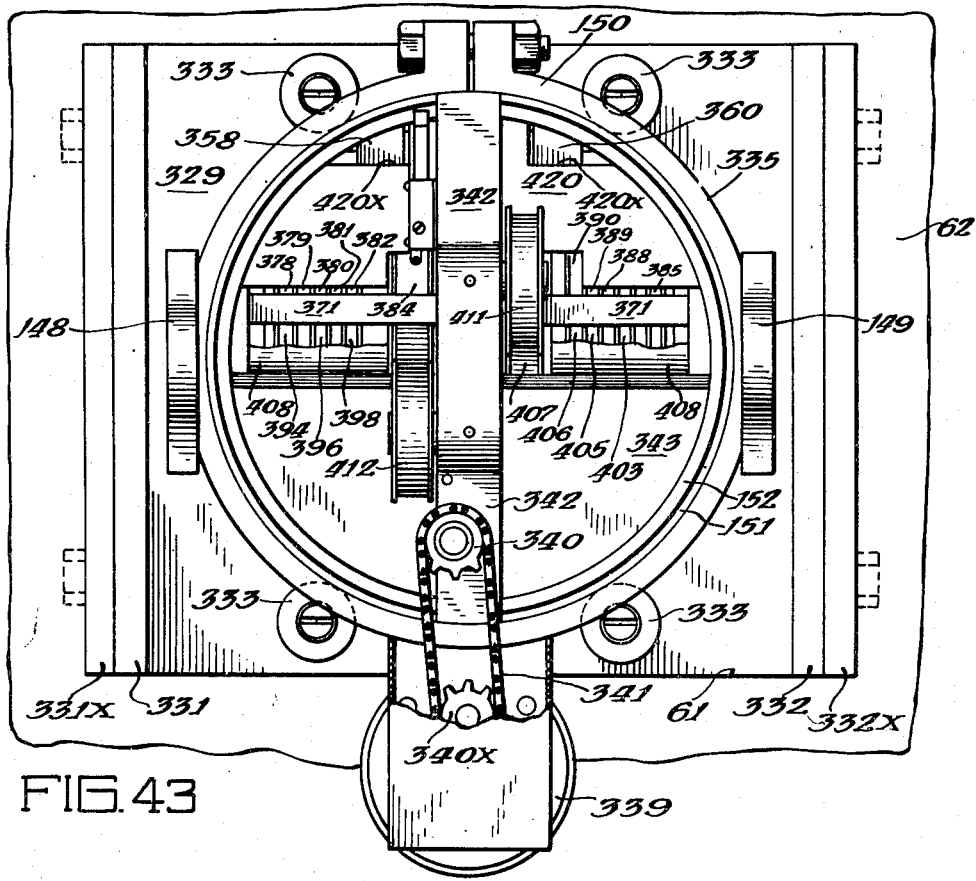
Fig. 43 is an enlarged end view, with parts cut away, of the telescopic tube assembly and the mounting means therefor.
Figure 44:
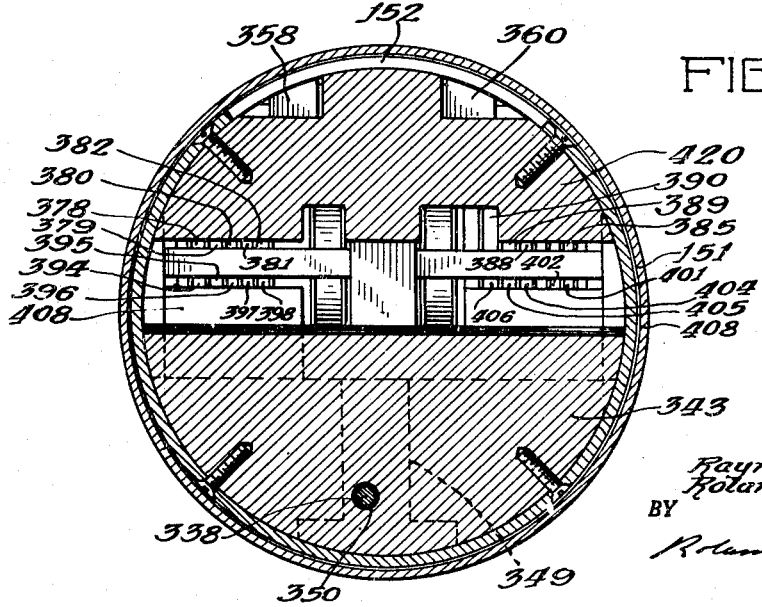
Fig. 44 is an enlarged vertical sectional view taken on the line 44—44 of Fig. 42.

Inasmuch as the inner tube 152 is movable longitudinally with respect to the outer tube 151, roller means are provided to facilitate the movement. As shown in Figs. 45 and 47, the end of the outer tube 151 adjacent the rectangular plate 330 is provided with a plurality of rollers 336 which are disposed in radial planes passing through the longitudinal axis. These rollers are shown in Fig. 45 as being equally spaced about the periphery of the tubes, and one manner in which they may be mounted is shown in Fig. 47. Similar rollers 337 are disposed in the tube 152 near the extremity thereof beyond the wall 62, which is to the left in Fig. 42. The means by which the inner tube 152 may be moved longitudinally with respect to the outer tube 151 includes an elongated screw 338 which is shown in Fig. 42. As shown in Figs. 42 and 43 the screw is driven by a reversible motor 339 which is connected thereto by means of a pinion 340 secured to the end of the screw, a pinion 340x mounted on and driven by the motor, and a sprocket chain 341 engaging the pinions. The outer extremity of the tube 151, beyond the wall 62, is provided with a vertical bracket 342 which as shown in Figs. 42 and 43 is actually secured within the clamp 150 of the yoke 57 and is of arcuate section somewhat less than semicircular in size. The brace 342 has a bearing in which the very end of the screw 338 is journaled for rotation and is held against longitudinal movement with respect to the inner tube 152. As shown in Figs. 42 and 44, a block 343 is fixed to the interior surface of the inner tube 152 and freely receives the screw 338 in an opening. A nut 344 is secured to the block 343 in one end of the opening and has threaded engagement with the screw. The action of the screw on the nut serves to move the inner tube 152 into and out of the outer tube 151. A limit switch 345 mounted on the bracket 342 is connected with the motor 339 and is engageable by the adjacent end of the inner tube 152 so that drive of the motor is interrupted and the inner tube cannot move beyond the position of Fig. 42, that is, leftward as viewed in this figure. In addition, a limit switch 346 mounted at a mid region of the outer tube 151 as shown in Fig. 41, is connected with the motor 339 and has a roller riding on the inner tube 151 until the left end of the tube 151 moves beyond the roller at which time the roller moves radially inward of the tubes and actuates the switch 346, interrupting drive of the motor. Thereby, travel of the left end of the inner tube beyond the position of said switch is prevented. As shown in Fig. 15, there is at the lower end of the sleeve 107, a two-position switch 346x by which the operator can operate the motor 339 in either direction within the limits of the switches 345 and 346. The switch 346x is of course suitably connected with the motor 339.

The fact that the manipulator movements are transferred from one side to the other via the interior of the telescopic tubes 151 and 152 and the further fact that the tubes comprise an expanding and contracting unit requires that a mechanism for lengthening and shortening the tapes be installed. Essentially, this mechanism comprises a stationary pulley stand 347 (Fig. 42) and a movable pulley stand 348, over which the tapes are disposed in a manner to be described below. The pulley stand 347 includes a bracket 349 (Figs. 42 and 44) the lower end of which is fixed to the interior of the inner tube 152 and which supports a shaft 351 on which two banks of pulleys are disposed in a manner to be set forth below. The stand 347 is provided with an aperture parallel to the longitudinal axis of the tubes through which the screw 338 freely extends. The stand 347, being fixed to the inner tube 152, is the so-called fixed or stationary stand. The pulley stand 348 is the so-called moving stand, because it moves to the right at one half the velocity of that of the inner tube 152 when the telescopic tubes are expanded. The stand 348 includes a bell crank 352 (Fig. 42), a generally vertical arm which supports a bank of pulleys, and a generally horizontal arm which is provided with a roller 353. The bell crank 352 is pivotally mounted on an axle 354 (Figs. 42 and 45) by means of bearings 355, the ends of which axle are fixed to pinions 356 and 357. Each pinion is disposed between a pair of racks. Thus, the pinion 357 engages an upper rack 358 and a lower rack 359 and the pinion 356 engages an upper rack 360 and a lower rack 361 (Figs. 42 and 45). As shown in Fig. 45, the upper racks 358 and 360 are fixed to the interior surface of the outer tube 151 and extend through elongated openings 362 in the upper portion of the inner tube 152. The opening extends over most of the length of the inner tube so that as the inner tube is moved in and out of the outer tube, the upper racks provide no interference to this relative movement. In addition, two round holes 363 and 364 are provided in the upper surface of the outer tube 151 as a means of access to the interior of the tubes. These holes are over the elongated openings 362 as shown in Figs. 41 and 42.

Referring to Fig. 45, a detailed description will be given of the pulley stand 348 together with its associated parts. The lower racks 359 and 361 are mounted on a number of braces 365 and 366, respectively, by conventional means such as welding. The end of each brace, in turn, is secured to the interior surface of the inner tube 152 by means of screws. In addition, roller tracks 367 and 368 extend along the facing edges of the lower racks 359 and 361, respectively. Over the tracks 367 and 368 roll rollers 369 and 370, respectively, which are disposed on the axle 354 on either side of the bell crank. By virtue of this construction, as the telescopic assembly 55 is expanded, i. e., the inner tube 152 moves out of the outer tube 151, the lower racks 359 and 361 pass under the upper racks 358 and 360 until the racks are nearly completely overlapping. This action carries the pinions 356 and 357 to the right, as viewed in Fig. 42, at half the speed of the inner tube and its racks 359 and 361 until the extension of the tubes is halted, either by the operator of the manipulator or the action of the limit switch 346. When the inner tube 152 has moved to an extreme position to the right, as viewed in Fig. 42, it is clear that the pinions 357 will be carried to a position about midway the remote ends of the upper and lower racks. At such position the pulley stand 347 will have advanced towards the pulley stand 348, reducing the distance between them by about one half the length of the racks 358, 359, 360, and 361. The result is to increase the effective length of the tapes exactly in accordance with the increase in length of the telescopic assembly 55.

As shown in Fig. 45, the pulley bank 348 has two sets of pulleys disposed at opposite sides of the vertical arm of the bell crank 352. The primary support for the sets of pulleys is provided by a bracket 371, which is shown in Fig. 46 to comprise a back 371x and a plurality of generally horizontal arms extending from one side of the back. A wide central arm 372 of the bracket is bolted to the lower end of the bell crank. This central arm, two narrow intermediate arms 373, and two narrow end arms 374 and 375 have aligned apertures that receive two aligned shafts 375x and 375y which extend perpendicular to the axis of the telescopic tubes but out of the plane of said axis and have adjacent inner ends in the central arm 372. The shafts 375x and 375y are fixed in the arms of the bracket 371 by set screws 376 threaded in the outer arms 374 and 375 and pressing against the outer ends of the shafts. As shown in Figs. 45 and 46, the pulley bank 348 includes sets of pulleys on the shafts 375x and 375y. The set on the shaft 375x comprises pulleys 378, 379, 380, 381, 382, and 384, and the set on the shaft 375y comprises pulleys 385, 386, 387, 388, 389, 390, and 391. All pulleys are mounted on their respective shafts by means of bearings, and the pulleys 378 through 382 and the pulleys 385 through 390 are separately covered over approximately half their peripheries by pulley guards 391x. Each pulley guard is secured to an outer arm 374 or 375 and the adjacent intermediate arm 373 by means of arcuate segmental extensions 392 and 392x, respectively. The pulley guards cover only the portions of the pulleys that face the outer end of the inner tube 152, that is, the right end as viewed in Fig. 42. Screws 392y secure the arcuate extensions 392 and 392x to the arms 373, 374, and 375. Screws 392z secure the pulley guards to the arcuate extensions. The arcuate extensions 392 are about 180 degrees in length and extend above and below arms 373, but the arcuate extensions 392x being on the outer bracket arms 374 and 375, are about 90 degrees in length and do not extend above these arms so as not to have interference with the inner surface of the inner tube 152 to which arms 374 and 375 are directly adjacent. The pulleys 384 and 391 are wider than the other pulleys on the shafts 374x and 375x and are not covered by the pulley guards.

The support structure for the pulleys of the stand 347 which structure essentially comprises the bell crank 352, the pinions 356 and 357, and the roller 353 is well suited to give the necessary movement of the pulleys with respect to the inner tube 152 and to handle the torque that is exerted by the tapes on the pulleys about the axis of the shaft 354 on which the pinions 356 and 357 are located. The movement of the supporting structure with respect to the inner tube 152 is assured by the pinions 356 and 357 rolling on the racks 358, 359, 360, and 361. The roller 353 pressing against the outer tube 151 counteracts the torque exerted by the tapes on the pulleys while accommodating movement of the bell crank 352 with respect to the tubes 151 and 152. The roller 353 and the pinions 356 and 357 constitute a three-point support for the pulleys against the tubes 151 and 152, which is more advantageous than two sets of pinions like pinions 356 and 357 in engagement with the racks 358, 359, 360, and 361, because the extra set of pinions would require lengthening the racks and thus greater crowding of the interior of the tubes 151 and 152.

The pulley sets of the stationary stand 347, which was described above as being supported by the support block 349, are duplicates of the pulley sets of the movable stand 348, and a bracket 393 of the stand 347 is a duplicate of the bracket 371 of the stand 348, but extends in the opposite direction. As shown in Fig. 43, the pulley bank 347 has two sets on opposite sides of the central arm of the bracket 393. On one side there are closely spaced pulleys 394, 395, 396, 397, and 398, and a pulley 400 somewhat spaced therefrom, and on the other side there are closely spaced pulleys 401, 402, 403, 404, 405, and 406 and a pulley 407 somewhat spaced therefrom. The pulleys 400 and 407, which also appear in Fig. 41, are wider than the other pulleys and are similar to the pulleys 391 and 400 of stand 348. The sets of pulleys of stand 347 are provided with guards 408 which are similar to the guards 391x of stand 348 but reversely arranged so as to cover the pulleys at the left side as viewed in Fig. 41. The guards 408 may be attached to the bracket by arcuate segmental extensions that are similar to the extensions 392 and 392x of stand 348 but inverted and reversed with respect thereto. The corresponding pulleys of the pulley banks 347 and 348 are transversely aligned in the same planes. For example, the pulleys 378 and 394 and the pulleys 390 and 406 are aligned (Fig. 43). This is also true for the wider pulleys 384 and 400 and pulleys 391 and 407. The manner in which all of the foregoing pulleys are aligned with the pulleys mounted at each end of the telescopic tube 52 on the respective shafts, about which the arms 56 and 56a rotate, will become clear hereinbelow, where it will be explained how each tape is disposed with respect to its pulleys.

Referring to Fig. 42, a vertical bracket 410 is mounted in the end of the inner tube 152 in a manner similar to the brace 342 at the end of the outer tube 151, remote from the bracket 342. Bracket 342 carries pulleys 411 and 412 at opposite sides and different levels. Bracket 410 carries pulleys 413 and 414 at opposite sides and different levels. These pulleys have widths corresponding to those of wide pulleys 384, 391, 400, and 407 in the pulley stands 348 and 347. Pulleys 411, 407, 391, and 413 are in general transverse alignment with one another in about the same plane. Pulleys 412, 400, 384, and 414 are in general transverse alignment with one another in about the same plane.

Inasmuch as the present embodiment of the manipulator 50 has been described to operate with radioactive material, it is necessary to shield the inner tube 152 as much as possible in order to inhibit the passage of deleterious matter such as gamma rays. Accordingly, in Fig. 42 the block 343, which has previously been described as providing a mounting for the nut 344 in the tube 152, is formed of suitable shielding material. At the opposite end of the tube another block 415 of shielding material is provided, as shown in Figs. 42 and 45. Above the block 415 and on opposite sides of the same end of the tube 152, a pair of mounting blocks 416 of shielding material is attached as shown in Fig. 42, there being a space between the blocks 416 to accommodate the passage of tapes. To the upper portion of the inner tube 152 three shielding blocks 418, 419, and 420 are attached at spaced intervals. Block 418 is disposed at the right end of the elongated opening 362 and serves to shield whatever rays may pass between the upper racks. Block 419 which serves to shield the openings in the pulley bank 348 is attached to the upper portion of the inner tube 152 adjacent the pulley bank 348 and is provided with two channels 419x parallel to the longitudinal axis of the tube in order to accommodate the racks 358 and 360 when the tubes 151 and 152 are shifted with respect to one another. Block 419 and its channels 419x can be seen in Fig. 45 between and behind racks 358 and 360 and also in Fig. 42. Finally, block 420 is secured to the interior of the inner tube 152 at a position above the block 343 from which it is spaced sufficiently in order to accommodate the passage of the various tapes. As shown in Fig. 44, the block 420 is provided with two channels 420x in its upper surface contiguous to the tube 152 which accommodate the passage of the racks 358 and 360 when the inner tube 152 has moved to an extreme position out of the outer tube 151. Certain surfaces of the foregoing shielding blocks which engage the interior surface of the inner tube 152 are curved with arcs having radii equal to the radius of said tube. In addition, the shielding blocks are arranged in balanced relation about the interior of the tube 152 so that the center of gravity of the assembly comprising the tubes 151 and 152 and their attachments including the shielding blocks lies on the axis of the tubes 151 and 152, and the assembly will stay without outside help in any position to which it may be rotated.

As shown in Figs. 41, 45, and 48, the outer tube 151 is provided with two rollers 421 which roll on the sides of the slot 362 in the inner tube 152 during relative longitudinal movement between the tubes while preventing relative rotation of the tubes and binding between the sides of the slot 362 and the pinions 356 or 357 or their shaft 354. The rollers 421 are journaled through bearings 422 on the ends of threaded rods 423 which have threaded engagement with nuts 424 fixed to the outside of the outer tube 151. Jam nuts 424x fix the rods 423 in desired positions of adjustment with respect to the outer tube 151.

Figure 49:
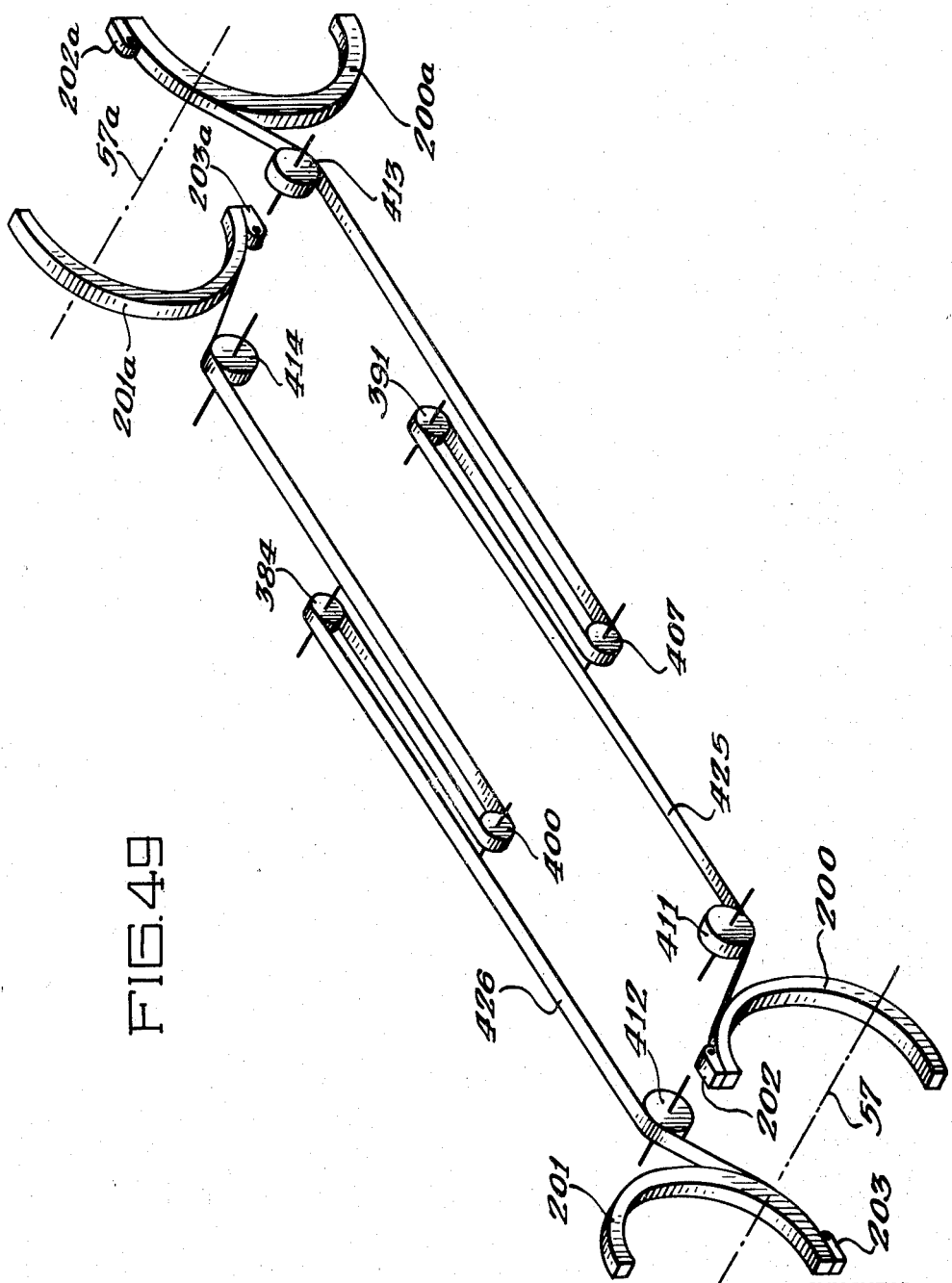
Fig. 49 is a diagrammatic view of the arrangement in which the arms of the manipulator are interconnected for conjoint angular movements about pivots at the ends of the telescopic assembly.

There remains to be described the tapes by which the various motions of the manipulator are transferred from one side to the other, together with the manner in which the tapes are disposed over the pulleys and other parts of the manipulator. For this purpose reference is made to Figs. 49, 50, 51, 52, and 53. These figures are used in preference to showing the tapes disposed over the drawings already described, and, for the purpose of clarity, only the pulleys and other parts contacting the tapes will be described. As was stated above, the arms 56 and 56a are maintained in parallel positions with respect to each other at all times. The connection of the arms to one another through the telescopic assembly 55 and the yokes 58 and 58a assures that the arms will remain parallel when they move angularly about the axis of the telescopic assembly 55. Parallelism of the arms when they move angularly about their pivots 57 and 57a on the telescopic assembly is assured by the arrangement of tapes and pulleys shown in Fig. 49. One end of the tape 425 is connected to the tape anchor 202 at the top of the drum segment 200, from which it extends beneath the pulley 411 into the interior of the telescopic tubes 151 and 152 where it passes around the pulley 391 in the pulley bank 348 and back to and around the pulley 407 in the pulley bank 347, from which it extends beneath the pulley 413 to the drum segment 200a where its other end is secured to the tape holder 202a at the top thereof. In a related but somewhat different manner a tape 426 extends from the anchor 203 at the lower end of the drum segment 201 over the pulley 412, around the pulleys 384 and 400, and over the pulley 414 to the anchor 203a at the lower end of the drum segment 201a. The fact that the ends of the tape 425 are attached to the top of the drum segments 200 and 200a and the ends of the tape 426 are attached to the lower side of their drum segments 201 and 201a assures that angular movement about the pivots 57 and 57a will be transmitted in both directions between the arms 56 and 56a.

It was stated above that the jaws 96 of the tongs 60 (Fig. 5) are closed by squeezing the levers 76 and 78 of the handle 59 (Fig. 3) together. This action, as shown in Fig. 50, exerts a tension upon the cable 91 in the handle which is conveyed through a tape 427 to the cable 95 in the tongs. The cables 91 and 95 are attached to the extremities of the tape 427 by means of externally grooved connecting rings 428 and 428a, respectively. The ends of the tape are looped about the rings, and the cables are looped through the rings. The fact that the pulleys in the tongs and handle, as well as in the gear assembly to which they are attached, would subject the tape to great wear and replacement necessitates the use of the cables 91 and 95, which are more easily replaceable by connecting their upper ends to their respective rings 428 and 428a which are located near the lower end of the corresponding boom tubes 111 and 111a. The tape 427 extends through the boom tube 111 to the top of the arm 53 where it passes over the pulley 292 (Fig. 28) from which it moves downwardly and around the pulley 181 and upwardly over the pulley 182 (Fig. 13) into and through the telescopic assembly 55 where it passes around the pulley 390 in the movable pulley bank 348 and the pulley 406 in the stationary pulley bank 347. Upon leaving the interior of the telescopic assembly 55, the tape 427 passes over the pulleys 182a (Figs. 19 and 20), downwardly and around the pulley 181a (Fig. 20), upwardly and around the pulley 277 (Fig. 22), and downwardly to the connecting ring 428a near the lower end of the boom tube 111a. It is to be noted that at the handle side of the manipulator the tape 427 loops about the vertically fixed pulley 292, whereas at the tong side the tape 427 loops about the vertically movable pulley 277. Thus as the handle 59 moves up toward the vertically fixed pulley 292 the reduction in length of tape 427 at the handle side will be compensated for by the increase in length of tape 427 at the tong side caused by the increase in spacing between the vertically movable pulley 277 and the vertically fixed pulley 181a, due to lifting of the tongs 60. The tongs 60 will rise as the handle 59 rises because of the tape connections between them shown in Figs. 51 and 53.

Fig. 51 shows tapes 429, 430, 431, and 432 by which the tongs 60 are rotated about two of their axes. The tape 429 is connected at one end to the take-up section 249 where it is anchored in a tape holder 271 (Figs. 23 and 25). From there it extends upwardly to and over the pulley 297 (Fig. 28) from which it descends to and over the pulleys 219x and 178 (Fig. 13) into the telescopic tube assembly 55, where it passes over the pulley 387 in the moveable pulley bank 348 and over the pulley 403 in the stationary pulley bank 347. From there the tape 429 extends out of the telescopic assembly and over the pulleys 178a (Fig. 20) and the pulley 219ax (Fig. 19) to the take-up section 249a where it is attached to a tape holder. The tape 430 is attached to a tape holder in the take-up section 250 (Fig. 23) from which it extends over the pulley 179 and into the telescopic tube 52 where it passes around the pulley 388 in the pulley bank 348 and the pulley 404 in the pulley bank 347. From the latter pulley the tape extends out of the telescopic tube and over the pulley 179a (Fig. 20) from which it passes up and around the pulley 311 (Fig. 33) and downwardly to the take-up section 250a where it is attached to a tape holder. The tape 431 is attached at one end to a tape holder on the take-up section 240 (Fig. 23) and passes downwardly under the pulley 174 (Fig. 13) and into the telescopic tube 52 where it passes around the pulley 381 (Fig. 45) in the movable pulley bank 348 and around the pulley 397 (Fig. 44) in the stationary pulley bank 347. From there the tape 431 extends out of the telescopic tube to the pulley 174a (Figs. 19 and 20) from which it goes up and around the pulley 309 (Fig. 33) and downwardly to the take-up section 240a where it is secured to a tape holder. Finally, the tape 432 is attached at one end to the take-up section 239 (Fig. 23) and passes up and around the pulley 303 (Fig. 29) and downwardly over the pulley 217 and 173 from which it extends into the telescopic tube 52 where it passes over the pulleys 380 and 396. From the latter pulley the tape 432 extends out of the tube over the pulleys 173a and 217a to the take-up section 239a where it is attached to a tape holder.

Referring to Fig. 9, when the handle is rotated about the trunnions 127 the differential gear 130, which engages the gear wheels 120 and 121, rotates said gears in the same direction about the trunnions, which action makes the drums 122 and 123 drive the tapes 144 and 145 (Fig. 51) in the same direction. As shown in Fig. 23, the sprocket chains 263 and 267 to which the tapes 144 and 145, respectively, are attached drive the sprockets 243 and 353 in the same direction, transferring this motion to the take-up device 238 on the shaft 236 and to the take-up device 247 on the shaft 246. These motions are transmitted to the tapes 429, 430, 431, and 432, as shown in Fig. 51, to the opposite side of the manipulator 50 where they are transmitted to the lower end of the boom tube 111a, through a similar set of take-up devices, pulleys, and sprockets to the gears 120a and 121a, which are caused to rotate in the same direction and thus swing the tongs 60 angularly about the trunnions 127.

Referring again to Fig. 9, if the handle 59 is rotated about the shaft 129 the differential gear 130 rotates the gears 120 and 121 in opposite directions, which in turn act through the aforementioned tapes, take-up devices, pulleys, and sprockets to cause the gears 120a and 121a to rotate in opposite directions. Accordingly, gears 120a and 121a rotate the differential gear 130a and the tongs 60 about the shaft 129a.

Another rotational movement may be established in the manipulator by rotating the handle 59 about the longitudinal axis of the boom tube 111. This motion is transferred to the tongs, causing them to rotate about the axis of the boom tube 111a, by means of the assembly shown in Fig. 52. When the boom tube 111 is so rotated, the bevel gear 229 (Fig. 23) fixed to the top of the boom tube, rotates the gears 241 and 251 in opposite directions. The take-up devices 242 and 252 which are attached to gears 241 and 251 rotate in opposite directions causing tapes 433 and 434 which are attached to the take-up devices 242 and 252, respectively, to wind and unwind (be taken up and let out), respectively, or unwind and wind, respectively. Tapes 433 and 434 extend upwardly and around the pulleys 302 and 296 (Fig. 29) from which they extend downwardly to the pulleys 175 and 180. From here the tapes 433 and 434 extend through the telescopic assembly 55 passing around the pulleys 382 and 389, respectively, in the pulley bank 348, and around the pulleys 398 and 405, respectively, in the pulley bank 347. The tapes then pass over the pulleys 175a and 180a and to the take-up devices 242a and 252a where their ends are secured to tape holders. The opposed movements of the take-up devices 242 and 252 in the handle side of the manipulator make the tapes 433 and 434 move in opposite directions, and thus the take-up devices 242a and 252a at the tong side of the manipulator move in opposite directions. The resultant opposed rotations of the associated gears 241a and 251a will cause rotation of the gear 299a, the boom tube 111a, and the tongs 60. When the handle 59 is raised, the vertically movable gear 229 and drums 242 and 252 will also be raised so as to decrease the distance between drums 242 and 252 and the vertically fixed gears 296 and 302. This action reduces the lengths of tapes 433 and 434 at the handle side of the manipulator and increases the lengths of tapes 433 and 434 at the tong side of the manipulator, and thus the vertically movable gears 229a, 241a, and 251a and drums 242a and 252a may move upward away from the vertically fixed pulleys 175a and 180a, this being required in order that the boom tube 111a and the tongs 60 may move up as the handle 59 moves up as aforesaid.

The vertical movements of the manipulator are transferred from the handle side to the tong side by means of the assembly shown in Fig. 53. When the handle 59 is raised, the boom tube 111 (Fig. 1) moves upward, taking the vertically movable frame 223 (Figs. 22 and 23) away from the vertically fixed pulleys 171 and 176 (Figs. 13 and 14). This action increases the lengths of the tapes 324x and 325x at the handle side of the manipulator, i. e., the portions of these tapes between the frame 223 and the pulleys 171 and 176. Thus these lengths of tapes 324x and 325x are necessarily decreased, and this involves decrease in distance between the vertically movable counterweight 313a and the vertically fixed pulleys 198a and 199a, between which counterweight and pulleys the tapes 324x and 325x extend. Thus counterweight 313a moves down. Since counterweight 313a is connected with vertically movable frame 223a through tape 321a which extends over vertically fixed pulley 307, the frame 223a moves up, carrying with it the boom tube 111a to which it is attached and the tongs 60 which are attached to boom tube 111a. Since the frame 223a moves up and away from vertically fixed pulleys 172a and 177a, the lengths of tapes 324 and 325 at the tong side of the manipulator increase. This increase must be matched by a corresponding decrease in the lengths of tapes 324 and 325 at the handle side of the manipulator. Such decrease can take place only between the vertically movable counterweight 313 and the fixed pulleys 198 and 199, and so the counterweight moves down. The counterweight 313 can move down, because the frame 223 moves up and the counterweight is connected with the frame by tape 321 which passes around vertically fixed pulley 291.

By way of recapitulation, the manipulator has seven degrees of freedom, that is, seven independent movements of which it is capable through action of the operator. Three of these movements involve rotation of the handle and tool per se with respect to their respective arms, namely, about the shaft 129 or 129a in the handle or tool, about the trunnions 127 or 127a in the handle or tool, and about the longitudinal axis of the arm 56 or 56a by rotation of the boom tube 111 or 111a. Two more of these movements involve rotation of the handle and tool together with the arms supporting them about the longitudinal axis of the telescopic assembly 55 and about the pivots 57 and 57a of the arms on the telescopic assembly. Two more of the movements involve straight-line motion, namely, movement of the handle and tongs and the boom tubes 111 and 111a attached to them along the longitudinal axes of the arms, and movement of the tongs and its arm with respect to the handle and its arm lengthwise of the telescopic assembly 55 by virtue of relative longitudinal movement of the tubes 151 and 152 of said assembly. Any two or more of these movements may occur simultaneously or each movement may occur alone. Moreover, the tool 60 and its arm 56a may move with respect to the handle 59 and its arm 56 by extension or contraction of the telescopic assembly 55.

It will be noted from Figs. 1, 2, and 8 that the wrist member 113–114 extends obliquely from the end of the boom tube 111 and that when the handle 59 is positioned as in Figs. 1 and 2 to cause the tool 60 to extend generally horizontally the finger grips 80, 81 are farther displaced from the longitudinal axis of the boom tube 111 than is the palm rest 71. Thus when the operator takes hold of the handle, the wrist joint of his engaging hand must be generally on the axis of the boom tube 111. Consequently, the wrist joint is employed for moving the handle about the axis of the boom tube, and this has the advantage that this movement will not necessarily involve other movements of the handle. The oblique relationship of the wrist member 113–114 allows wide angular movement of the handle 59 about the axis formed by the trunnions 127. The aforesaid relation of the wrist member 113–114 and the handle 59 which is shown on a small scale in Fig. 1 can be observed on a large scale by placing Figs. 2 and 8 side by side with Fig. 8 to the left and swinging the fragment of the handle connection shown at the bottom of Fig. 8 to the right side. The offset mounting of the tool 60 on the wrist member 113a–114a with respect to the axis of the boom tube 111a permits the actual length of the tool 60 itself to be shorter for a given effective length of the tool measured from the axis of the boom tube 111a to the outer end of the tool. The actual length of the tool being shorter, the tool can be maneuvered more easily through the wide angle that is made possible by the mounting of the handle 59 on the end of the obliquely arranged wrist member 113–114.

The teachings of the invention shall not be deemed to be limited to the embodiments illustrated in the drawings and described above. Many equivalent devices employing the teachings will readily be devised by persons skilled in the art. Consequently, the present invention shall be deemed to be limited only by the appended claims.

What is claimed is:

1. A remote-control manipulator comprising tongs including a pair of movable jaws, a handle including lever means pivotally secured to the handle, an intermediate support unit including inner and outer telescopic tubes, means for extending and retracting the tubes with respect to each other, two sleeves rotatably mounted on the tubes, one sleeve being mounted on one end of the outer tube and the other sleeve being mounted on the end of the inner tube remote from said one end of the outer tube, means for rotating the sleeves in parallel motion, an elongated arm rotatably mounted within each sleeve and movable longitudinally therein, means for mounting the tongs on one end of one of the arms including a pair of gear wheels, means for mounting the handle on the corresponding end of the other arm including a pair of gear wheels, a motion-transmitting means operatively connecting separately the corresponding gear wheels of the tongs and handle so as to cause rotation of the tongs in response to rotation of the handle, and means connecting the lever means to the jaws so that movement of the lever means imparts movement to the jaws.

2. A remote-control manipulator comprising two substantially parallel arms, a support unit between the arms including inner and outer telescopic tubes, means for extending and retracting the tubes, each arm including a sleeve rotatably mounted on each tube, one sleeve being mounted on one side of the outer tube and the other sleeve being mounted on the end of the inner tube remote from said one end of the outer tube, the axes of rotation of the sleeves being normal to the longitudinal axis of the tubes, each arm also including at least two guides secured to and extending longitudinally from each sleeve in a similar direction, a boom tube movably disposed in each sleeve and a counterweight movably mounted between and on the guides, tongs rotatably attached to the end of one boom tube and including a pair of movable jaws and trunnions and a pinion about which the tongs are adapted to rotate, a handle rotatably attached to the corresponding end of the other boom tube including a pivot lever and trunnions and a pinion about which the handle is adapted to rotate, a first motion-transmitting means connected to the tongs and handle so as to cause rotation of the tongs in response to rotation of the handle, and a second motion-transmitting means extending through the boom tubes and the telescopic tubes, the product of the weight of the portion of each arm on one side of the axis of the unit and of the distance of the center of gravity of said portion from said axis being equal to the product of the weight and distance of the portion of the arm on the other side of said axis, the product of the weight of the portion of each arm on one side of the point of rotation of the sleeve and of the distance of the center of gravity of said portion from said point being equal to the product of the weight and distance of the portion of the arm on the other side of said point.

3. A remote-control manipulator comprising an intermediate support; a pair of arms positioned at regions of the support spaced lengthwise thereof and extending generally transversely thereof, each arm comprising a stationary part connected to one of said regions for swinging about a pivot axis transverse to the length of the intermediate support and having outer guide means spaced from said pivot axis and inner guide means adjacent said pivot axis, and a movable part mounted on the stationary part for movement therealong transverse to said pivot axis and having take-up devices located between the inner and outer guiding means so as to be shiftable toward one guide means and away from the other with movement of the movable part along the stationary part, a mounting member carried by the end of the movable part on the side of said pivot axis opposite the outer guide means and take-up devices for rotations about two axes transverse to one another, means connecting the mounting member with the take-up devices to cause rotation of the mounting member about one of its axes to move the take-up devices in the same direction and rotation of the mounting member about the other of its axes to move the take-up devices in opposite directions; a tool supported by the mounting member on one arm; a handle supported by the mounting member on the other arm and being adapted to operate the tool; and two pairs of flexible ties enabled by movements in the directions of their lengths to transmit the aforesaid rotations of the mounting member carrying the handle to the mounting member carrying the tool, said pairs of flexible ties being connected to the take-up devices on the two arms for being taken up and let out thereby and extending over the inner guide means at the two arms and along the intermediate support, one tie of each pair extending on one arm directly from a take-up device to the inner guide means and on the other arm indirectly from a take-up device to the inner guide means by way of the outer guide means, the other tie of each pair extending on the said other arm directly from a take-up device to the inner guide means and on the said one arm indirectly from a take-up device to the inner guide means by way of the outer guide means.

4. A remote-control manipulator comprising an intermediate support; a pair of arms positioned at regions of the support spaced lengthwise thereof and extending generally transversely thereof, each arm comprising a stationary part connected to one of said regions for swinging about a pivot axis transverse to the length of the intermediate support and having outer guide means spaced from said pivot axis and inner guide means adjacent said pivot axis, and a movable part mounted on the stationary part for straight-line movement therealong transverse to said pivot axis and for rotational movement about an axis transverse to said pivot axis and having take-up devices located between the inner and outer guiding means so as to be shiftable toward one guide means and away from the other with movement of the movable part along the stationary part; means connecting the movable part with the take-up devices to cause rotation of the movable part to move the take-up devices in opposite directions; a tool supported by the movable part of one arm at its end on the side of the pivot axis opposite the outer guide means; a handle supported by the corresponding end of the movable part on the other arm and being adapted to operate the tool; and a pair of flexible ties enabled by movements in the directions of their lengths to transmit rotation of the movable part carrying the handle to the movable part carrying the tool, said pair of flexible ties being connected to the take-up devices on the two arms for being taken up and let out thereby and extending over the inner guide means at the two arms and along the intermediate support, the ties extending on one arm directly from the take-up devices to the inner guide means and on the other arm indirectly from the take-up devices to the inner guide means by way of the outer guide means.

5. A remote-control manipulator comprising an intermediate support; a pair of arms positioned at regions of the support spaced lengthwise thereof and extending generally transversely thereof, each arm comprising a stationary part connected to one of said regions for swinging about a pivot axis transverse to the length of the intermediate support and having first and second outer guide means spaced from and on opposite sides of said pivot axis and inner guide means adjacent said pivot axis, a movable part mounted on the stationary part for movement therealong transverse to said pivot axis and having an actuating end on the same side of said pivot axis as the second outer guide means and a control end on the opposite side of said pivot axis between the inner guide means and the first outer guide means, and a counterweight; a tool mounted on the actuating end of the movable part of one arm; a handle mounted on the corresponding region of the other arm and being adapted to operate the tool; and flexible tie means connected to the control end of the movable part of one arm and extending thence over the inner guide means of the said one arm, thence along the intermediate support, thence on the other arm successively over the inner guide means, the second outer guide means, the first outer guide means, and the inner guide means, and thence along the intermediate support, and thence on the said one arm successively over the inner guide means, the second outer guide means, and the first outer guide means, and back to the control end of the movable part to which it is connected; and means connecting one counterweight to the region of the flexible tie means between the first and second outer guide means on one arm and the other counterweight to the region of the flexible tie means between the first and second outer guide means on the other arm.

6. A remote-control manipulator as specified in claim 5, the counterweights extending generally parallel to the pivot axes on which the stationary parts of the arms are mounted on the intermediate support, the portions of the flexible tie means extending over the first outer guide means on each arm being connected to a mid region of the counterweight and to a central region on the control end of the movable part of the particular arm, each of the portions of the flexible tie means extending from the counterweights of the one arm and the other arm to the control ends of the movable parts of the said other arm and the said one arm by way of the second outer guide means and the inner guide means of the two arms being separated into two spaced parallel branches connected adjacent the ends of the counterweights and to outer regions of the control ends of the movable parts of the arms.

7. A remote-control manipulator as specified in claim 6, the stationary part of each arm having spaced opposed portions cooperating with the ends of the associated counterweight to restrain the same against movement in the direction of its length and in one direction transverse of its length while accommodating movement in another direction transverse of its length.

8. A remote-control manpulator comprising an intermediate support; a pair of arms positioned at regions of the support spaced lengthwise thereof and extending generally transversely thereof, each arm comprising a stationary part connected to one of said regions for swinging about a pivot axis transverse to the length of the intermediate support and having an inner guide adjacent its pivot axis, and a movable part mounted on the stationary part for movement therealong transverse to said pivot axis; a handle mounted on the movable part of one arm to one side of the pivot axis of the said one arm; a tool mounted on the movable part of the other arm to one side of the pivot axis of the said other arm; an outer guide mounted on the stationary part of one arm on the side of its pivot axis opposite to the handle or tool associated with the said one arm; an outer guide mounted on the movable part of the other arm on the side of its pivot axis opposite the tool or handle mounted on the said other arm; and flexible tie means connecting the handle and the tool in response to action by way of the handle and extending from one of the handle and the tool successively over the outer guide and the inner guide on one arm, along the intermediate support, and over the inner guide and the intermediate guide on the other arm to the other of the handle and the tool.

9. A manipulator as specified in claim 8, the handle being associated with the arm on which the outer guide is located on the movable part, the tool being a grasper and being associated with the other arm.

10. A remote-control manipulator comprising an intermediate support, a pair of arms connected to regions of the support spaced lengthwise thereof for pivoting about axes generally transverse to the length of the intermediate support, a handle mounted on one arm for movement along the arm toward and away from its pivot axis and for rotation about three different axes in the arm, a grasper mounted similarly on the other arm, and flexible tie means connecting the handle and the grasper for causing a given motion or rotation by the handle to be reproduced by the grasper and extending along the arms and between the arms, those portions of the flexible tie means between the arms extending only along the intermediate support.

11. A remote-control manipulator as specified in claim 10, the intermediate support comprising telescoping tubes longitudinally adjustable with respect to one another to vary the distance between the pivot axes of the arms on the intermediate support, the portions of the flexible tie means between the arms extending through the telescoping tubes.

12. The remote-control manipulator specified in claim 11 and further comprising two guide means positioned in the intermediate support in longitudinally spaced relation so as to be relatively near to and relatively far from one arm, the flexible tie means extending from the said one arm to and around the far guide means, thence back to and around the near guide means, and thence to the other arm, means mounting one guide means so as to enable it to move conjointly with and through the same distance as the one tube with respect to the other, and means mounting the other guide means so as to enable it to move conjointly with the said one tube but only through half the said distance.

13. The remote-control manipulator specified in claim 10 and further comprising counterweights mounted on the arms and associated with the handle and the grasper so as to move along the arms in opposite directions to the handle and the grasper, the intermediate support having its center of gravity on its longitudinal axis, the combined center of gravity of each arm, its counterweight, and the handle or grasper regardless of the positions of the handle or grasper and the associated counterweight along the arm or the angle of the arm with respect to the support, whereby the arms will stay without outside help in whatever position they are placed.

14. A remote-control manipulator comprising an intermediate support, a pair of arms connected to regions of the support spaced lengthwise thereof for pivoting about axes generally transverse to the length of the intermediate support, a handle mounted on one arm for movement with the arm about its pivot axis and for other movements with respect to the arm, a grasper similarly mounted on the other arm, flexible tie means connecting the handle and the grasper for causing a given motion by the handle to be reproduced by the grasper and extending along the arms and between the arms, those portions of the flexible tie means between the arms extending only along the intermediate support, the intermediate support comprising relatively longitudinally adjustable parts so as to vary the distance betwen the pivot axes of the arms on the intermediate support, two guide means positioned on the intermediate support in longitudinally spaced relation so as to be relatively near to and relatively far from one arm, the flexible tie means extending from the said one arm to and around the far guide means, thence back to and around the near guide means, and thence to the other arm, means fixing one guide means to one part of the intermediate support, and means mounting the other guide means for movement with respect to both parts of the intermediate support, said last mentioned means comprising gear racks secured to said parts and a pinion attached to said other guide means and positioned between the racks in meshing engagement therewith.

15. A remote-control manipulator comprising an intermediate support, a pair of arms pivotally connected to regions of the support spaced lengthwise thereof and extending generally transversely thereof, two wrist members mounted at the ends of the arms for swinging about the longitudinal axes of the arms and extending at oblique angles from the arms, a handle mounted on a pivot on the end of one wrist member spaced from the arm from which it extends, the handle comprising a palm rest and movable finger grips on opposite sides of the palm rest at greater distances from the handle pivot than the palm rest is, whereby when the operator's palm and fingers are applied to the palm rest and finger grips, his wrist joint may be generally on the longitudinal axis of the aforesaid arm and the operator swings the wrist member and the handle about said longitudinal axis by angularly moving his hand about his wrist joint, a grasper mounted on a pivot on the end of the other wrist member spaced from the arm from which it extends, and means connecting the finger grips of the handle with the grasper for opening the grasper through movement of the finger grips.

16. A remote-control manipulator comprising an intermediate support, a pair of arms pivoted on the support on parallel axes spaced from one another along the support, a handle mounted on one arm, a grasper mounted on the other arm and connected with the handle so as to be opened and closed by actuation of the handle and to move with respect to its arm in accordance with the movement of the handle with respect to its arm, and means interconnecting the arms to cause them to have conjoint movements about their said pivot axes and to remain parallel to one another during such movements, said means comprising a first take-up means secured to one arm on its side facing the other arm and having its center of curvature on the pivot axis of said one arm, a second take-up means secured to said other arm on its side facing the said one arm and having its center of curvature on the pivot axis of the said other arm, a first flexible tie having its ends connected to regions of the first and second take-up means displaced in one direction from a plane containing the pivot axes of the arms, a second flexible tie having its ends connected to regions of the first and second take-up means displaced in the opposite direction from the plane containing the pivot axes of the arms, and guides mounted on the intermediate support adjacent the first and second take-up means so as to cause portions of the flexible ties to extend partially around the first and second take-up means.

References Cited in the file of this patent

UNITED STATES PATENTS

| Number | Name | Date |
| --- | --- | --- |
| 2,632,574 | Goertz | Mar. 24, 1953 |